(12) United States Patent
Iwashita

(10) Patent No.: US 8,237,942 B2
(45) Date of Patent: Aug. 7, 2012

(54) PRINT CONFIGURATION PROGRAM AND INFORMATION PROCESSING APPARATUS

(75) Inventor: Kazue Iwashita, Tokyo (JP)

(73) Assignee: Oki Data Corporation, Tokyo (JP)

( * ) Notice: Subject to any disclaimer, the term of this patent is extended or adjusted under 35 U.S.C. 154(b) by 967 days.

(21) Appl. No.: 12/238,928

(22) Filed: Sep. 26, 2008

(65) Prior Publication Data

US 2009/0086268 A1 Apr. 2, 2009

(30) Foreign Application Priority Data

Sep. 28, 2007 (JP) ................................. 2007-255865

(51) Int. Cl.
*G06F 3/12* (2006.01)
*G06F 3/00* (2006.01)

(52) U.S. Cl. ...... 358/1.13; 358/1.1; 358/1.15; 358/1.16; 399/81; 399/83; 715/745; 715/747

(58) Field of Classification Search .................... 358/1.1, 358/115, 1.9, 1.13, 1.16
See application file for complete search history.

(56) References Cited

U.S. PATENT DOCUMENTS

| 6,032,001 A * | 2/2000 | Miyawaki | 399/8 |
| 7,221,885 B2 * | 5/2007 | Sato | 399/81 |
| 7,913,168 B2 * | 3/2011 | Hoshino et al. | 715/273 |
| 2006/0132813 A1 * | 6/2006 | Mitani et al. | 358/1.13 |
| 2007/0109580 A1 * | 5/2007 | Yoshida | 358/1.13 |
| 2008/0088865 A1 * | 4/2008 | Nagai | 358/1.13 |
| 2008/0304849 A1 * | 12/2008 | Harigae | 399/83 |

FOREIGN PATENT DOCUMENTS

JP 2004-046468 A 2/2004

* cited by examiner

*Primary Examiner* — Twyler Haskins
*Assistant Examiner* — Dennis Dicker
(74) *Attorney, Agent, or Firm* — Panitch Schwarze Belisario & Nadel LLP

(57) ABSTRACT

A printing setting program is provided that can be executed by an information processing apparatus for setting a printing condition. The printing setting program has: a plurality of setting sections, each of the plurality of setting sections having a setting item for setting a printing process; a displaying section adapted for displaying the setting section; a detecting section adapted for detecting a change of the setting item; and a memorizing section adapted for memorizing setting item information relating to the setting item detected as changed by the detecting section, wherein one of the plurality of setting sections displayed in a front of the plurality of setting sections at a start of the printing setting program is determined according to the setting item information memorized in the memorizing section.

6 Claims, 26 Drawing Sheets

| RULE IDENTIFICATION NUMBER rule_No. | RULE NAME rule [rule_No.] | DEFAULT SETTING def_rule [rule_No.] | PRESENT SETTING set_rule [rule_No.] |
|---|---|---|---|
| 1 | DISPLAYING A PANEL INCLUDING AN ITEM HAVING A HIGH FREQUENCY OF CHANGES? | YES | YES |
| 2 | RESETTING THE SETTING CHANGE NUMBER? | NO | NO |
| 3 | DETECTION START DAY AND TIME OF SETTING CHANGE NUMBER | PRESENT DAY AND TIME | 2007/01/01/00/00/00 |
| 4 | DETECTION END DAY AND TIME OF SETTING CHANGE NUMBER | PRESENT DAY AND TIME | 2007/01/31/22/00/00 |

| PANEL IDENTIFICATION NUMBER p_No. | SETTING ITEM IDENTIFICATION NUMBER item_No. | SETTING ITEM NAME item_Name [p_No.] [item_No.] | DEFAULT SETTING def_set [p_No.] [item_No.] | CHANGE NUMBER OF EACH SETTING ITEM count [p_No.] [item_No.] | TOTAL CHANGE NUMBER count_d |
|---|---|---|---|---|---|
| 1 | 1 | NUMBER OF COPIES | 1 | 20 | 90 |
| 2 | 1 | PAPER FEEDING | TRAY 1 | 30 | |
| | 2 | AUTOMATIC TRAY SELECTION | ON | 40 | |

FIG. 5

| RULE IDENTIFICATION NUMBER rule_No. | RULE NAME rule [rule_No.] | DEFAULT SETTING def_rule [rule_No.] | PRESENT SETTING set_rule [rule_No.] |
|---|---|---|---|
| 1 | DISPLAYING A PANEL INCLUDING AN ITEM HAVING A HIGH FREQUENCY OF CHANGES? | YES | YES |
| 2 | RESETTING THE SETTING CHANGE NUMBER? | NO | NO |
| 3 | DETECTION START DAY AND TIME OF SETTING CHANGE NUMBER | PRESENT DAY AND TIME | 2007/01/01/00/00/00 |
| 4 | DETECTION END DAY AND TIME OF SETTING CHANGE NUMBER | PRESENT DAY AND TIME | 2007/01/31/22/00/00 |

FIG. 6

| PANEL INDEX OF HIGH FREQUENCY OF SETTING CHANGES p_No. | DEFAULT PANEL INDEX def_p_No. |
|---|---|
| 2 | 1 |

FIG. 7

| PANEL IDENTIFICATION NUMBER | SETTING ITEM IDENTIFICATION NUMBER | CHANGE FREQUENCY OF EACH SETTING ITEM |
|---|---|---|
| p_No. | item_No. | ave [p_No.] [item_No.] |
| 1 | 1 | 20/90 |
| 2 | 1 | 30/90 |
|   | 2 | 40/90 |

FIG. 8

| PANEL IDENTIFICATION NUMBER p_No. | SETTING ITEM IDENTIFICATION NUMBER item_No. | SETTING ITEM NAME item_Name [p_No.] [item_No.] | DEFAULT SETTING def_set [p_No.] [item_No.] | CHANGE NUMBER OF EACH SETTING ITEM count [p_No.] [item_No.] | CHANGE NUMBER OF EACH PANEL count_p [p_No.] | TOTAL CHANGE NUMBER count_d |
|---|---|---|---|---|---|---|
| 1 | 1 | NUMBER OF COPIES | 1 | 20 | 20 | 90 |
| 2 | 1 | PAPER FEEDING | TRAY 1 | 30 | 70 | |
| | 2 | AUTOMATIC TRAY SELECTION | ON | 40 | | |

FIG. 13

| RULE IDENTIFICATION NUMBER rule_No. | RULE NAME rule [rule_No.] | DEFAULT SETTING def_rule [rule_No.] | PRESENT SETTING set_rule [rule_No.] |
|---|---|---|---|
| 1 | DISPLAYING A PANEL INCLUDING AN ITEM HAVING A HIGH FREQUENCY OF CHANGES? | YES | YES |
| 2 | RESETTING THE SETTING CHANGE NUMBER? | NO | NO |
| 3 | SELECTING THE PANEL RADIO BUTTON? | YES | YES |
| 4 | SELECTING THE SETTING ITEM RADIO BUTTON? | NO | NO |
| 5 | DETECTION START DAY AND TIME OF SETTING CHANGE NUMBER | PRESENT DAY AND TIME | 2007/01/01/00/00/00 |
| 6 | DETECTION END DAY AND TIME OF SETTING CHANGE NUMBER | PRESENT DAY AND TIME | 2007/01/31/22/00/00 |

FIG. 14

| PANEL IDENTIFICATION NUMBER | SETTING ITEM IDENTIFICATION NUMBER | CHANGE FREQUENCY OF EACH SETTING ITEM | CHANGE FREQUENCY OF EACH PANEL |
|---|---|---|---|
| p_No. | item_No. | ave [p_No.] [item_No.] | ave_p [p_No.] |
| 1 | 1 | 20/90 | 20/90 |
| 2 | 1 | 30/90 | 70/90 |
|   | 2 | 40/90 |   |

FIG. 15

| RULE IDENTIFICATION NUMBER rule_No. | RULE NAME rule [rule_No.] | DEFAULT SETTING def_rule [rule_No.] | PRESENT SETTING set_rule [rule_No.] |
|---|---|---|---|
| 1 | DISPLAYING A PANEL INCLUDING AN ITEM HAVING A HIGH FREQUENCY OF CHANGES? | YES | YES |
| 2 | RESETTING THE SETTING CHANGE NUMBER? | NO | NO |
| 3 | SELECTING THE PANEL RADIO BUTTON? | YES | YES |
| 4 | SELECTING THE SETTING ITEM RADIO BUTTON? | NO | NO |
| 5 | DETECTION START DAY AND TIME OF SETTING CHANGE NUMBER | PRESENT DAY AND TIME | 2007/01/01/00/00/00 |
| 6 | DETECTION END DAY AND TIME OF SETTING CHANGE NUMBER | PRESENT DAY AND TIME | 2007/01/31/22/00/00 |
| 7 | SETTING CHANGE NUMBER NEEDING TO USE THE PAST CHANGE FREQUENCY | 50 | 50 |

FIG. 20

| PANEL IDENTIFICATION NUMBER | SETTING ITEM IDENTIFICATION NUMBER | CHANGE FREQUENCY OF EACH SETTING ITEM | CHANGE FREQUENCY OF EACH PANEL | TOTAL CHANGE NUMBER | CHANGE FREQUENCY OF EACH SETTING ITEM (PREVIOUSLY CALCULATED) | CHANGE FREQUENCY OF EACH PANEL (PREVIOUSLY CALCULATED) | TOTAL CHANGE NUMBER (PREVIOUSLY CALCULATED) |
|---|---|---|---|---|---|---|---|
| p_No. | item_No. | ave [p_No.] [item_No.] | ave_p [p_No.] | count_d | P_ave [p_No.] [item_No.] | P_ave_p [p_No.] | P_count_d |
| 1 | 1 | 2/9 | 2/9 | 90 | 30/50 | 30/50 | 50 |
| 2 | 1 | 3/9 | 7/9 | | 15/50 | 20/50 | |
| | 2 | 4/9 | | | 5/50 | | |

FIG. 21

| PANEL CHANGED LAST IN THE PREVIOUS TIME | ITEM CHANGED LAST IN THE PREVIOUS TIME | DEFAULT PANEL |
|---|---|---|
| p_No. | item_No. | def_p_No. |
| 2 | 2 | 1 |

FIG. 26

PRINT CONFIGURATION PROGRAM AND INFORMATION PROCESSING APPARATUS

BACKGROUND OF THE INVENTION

1. Field of the Invention

This invention relates to a print setting program for setting a printing condition at an information processing apparatus connected to a printer for performing printing at the printer.

2. Description of Related Art

A printing condition setting screen displayed on an information processing apparatus connected to a printer when the printer makes printing, includes many setting items according to diversified functions of the printer these days. For example, a setting screen has plural printing setting panels such as tabs and pull-down menu, and a printing condition is entered into each setting item by switching those panels with user's control for each printing process, as disclosed in Japanese Unexamined Patent Publication No. 2004-46468.

The printing setting panel displayed on a front side of such a screen is always set. For a user makes a setting specialized for some special setting items, however, he has to switch the printing setting panels for each printing setting made by him unless the special setting item is displayed on the front side of the screen.

In consideration of the above situations, it is an object of the invention to provide a printing setting program capable of detecting changes from a printing condition set as a default and of displaying the printing setting panel displayed on a front side upon changing the panel. It is a further object of the invention to provide an information processing apparatus having such a printing setting program.

SUMMARY OF THE INVENTION

The foregoing objects are accomplished with an invented printing setting program that can be executed by an information processing apparatus for setting a printing condition. The printing setting program has: a plurality of setting sections, each of the plurality of setting sections having a setting item for setting a printing process; a displaying section adapted for displaying the setting section; a detecting section adapted for detecting a change of the setting item; and a memorizing section adapted for memorizing setting item information relating to the setting item detected as changed by the detecting section, wherein one of the plurality of setting sections displayed in a front of the plurality of setting sections at a start of the printing setting program is determined according to the setting item information memorized in the memorizing section.

In another aspect of the invention, an information processing apparatus is installed with the print setting program described above.

BRIEF DESCRIPTION OF THE DRAWINGS

The above and other objects, features and advantages of the present invention will become more apparent from the following description of the presently preferred exemplary embodiments of the invention taken in conjunction with the accompanying drawing, in which:

FIG. 5 is a schematic diagram showing a structure of a printing setting storing section of the printer driver described in the first embodiment of the invention;

FIG. 6 is a schematic diagram showing a structure of a judgment rule storing section of the printer driver described in the first embodiment of the invention;

FIG. 7 is a schematic diagram showing a structure of a judgment result storing section of the printer driver described in the first embodiment of the invention;

FIG. 8 is a schematic diagram showing a structure of a frequency storing section of the printer driver described in the first embodiment of the invention;

FIG. 13 is a schematic diagram showing a structure of a printing setting storing section of the printer driver described in the second embodiment of the invention;

FIG. 14 is a schematic diagram showing a structure of a judgment rule storing section of the printer driver described in the second embodiment of the invention;

FIG. 15 is a schematic diagram showing a structure of a frequency result storing section of the printer driver described in the second embodiment of the invention;

FIG. 20 is a schematic diagram showing a structure of a judgment rule storing section of the printer driver described in the third embodiment of the invention;

FIG. 21 is a schematic diagram showing a structure of a frequency result storing section of the printer driver described in the third embodiment of the invention;

FIG. 26 is a schematic diagram showing a structure of a judgment rule storing section of the printer driver described as the modified program of the invention.

DESCRIPTION OF PREFERRED EMBODIMENTS OF THE INVENTION

Hereinafter, with reference to the drawings, preferred embodiments of the invention are described.

[First Embodiment]

In the first embodiment of the invention, described are a printing setting program detecting a frequency of changes from the default setting of the printing condition set at a time of printing execution and reflecting the information to the displaying screen in accordance with the frequency.

Figure 1:
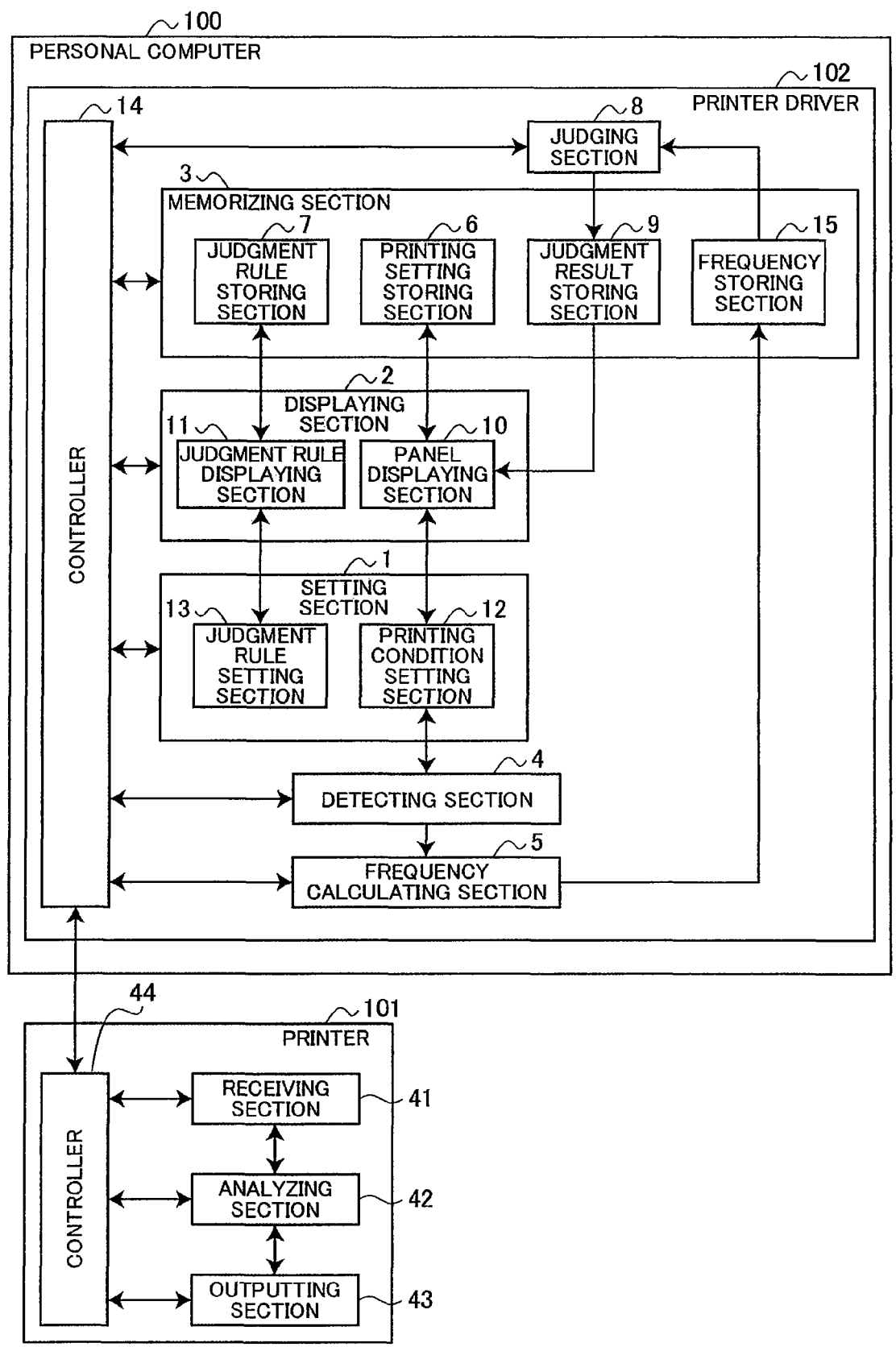
FIG. 1 is a block diagram showing a structure of a personal computer and a printer driver described in the first embodiment of the invention.

A personal computer 100 serving as an information processing apparatus according to the first embodiment of the invention as shown in FIG. 1 is connected to a printer 101 and stores a printer driver 102 as a printing setting program of the invention. The personal computer 100 can realize the following functions with a CPU (central processing unit) controlled according to the printer driver 102 extended on a memory not shown.

The printer driver 102 equipped by installation in the personal computer 100 includes a setting section 1 serving as a setting means, a displaying section 2 serving as a displaying means, a memorizing section serving as a memorizing means, a detecting section 4 serving as a detecting means, a frequency calculating section 5 serving as a frequency calculating means, a judging section serving as a judging means, and a controller 14.

The setting section 1 includes a printing condition setting section 12 serving as a printing condition setting means, and a judgment rule setting section 13 serving as a judgment rule setting means. The printing condition setting section 12 has plural setting items on a setting screen for printing setting by entry of a printing condition. The setting item is displayed in a manner divided into plural printing setting panels such as, e.g., tabs and pull-down menus according to the contents thereof.

Figure 2:
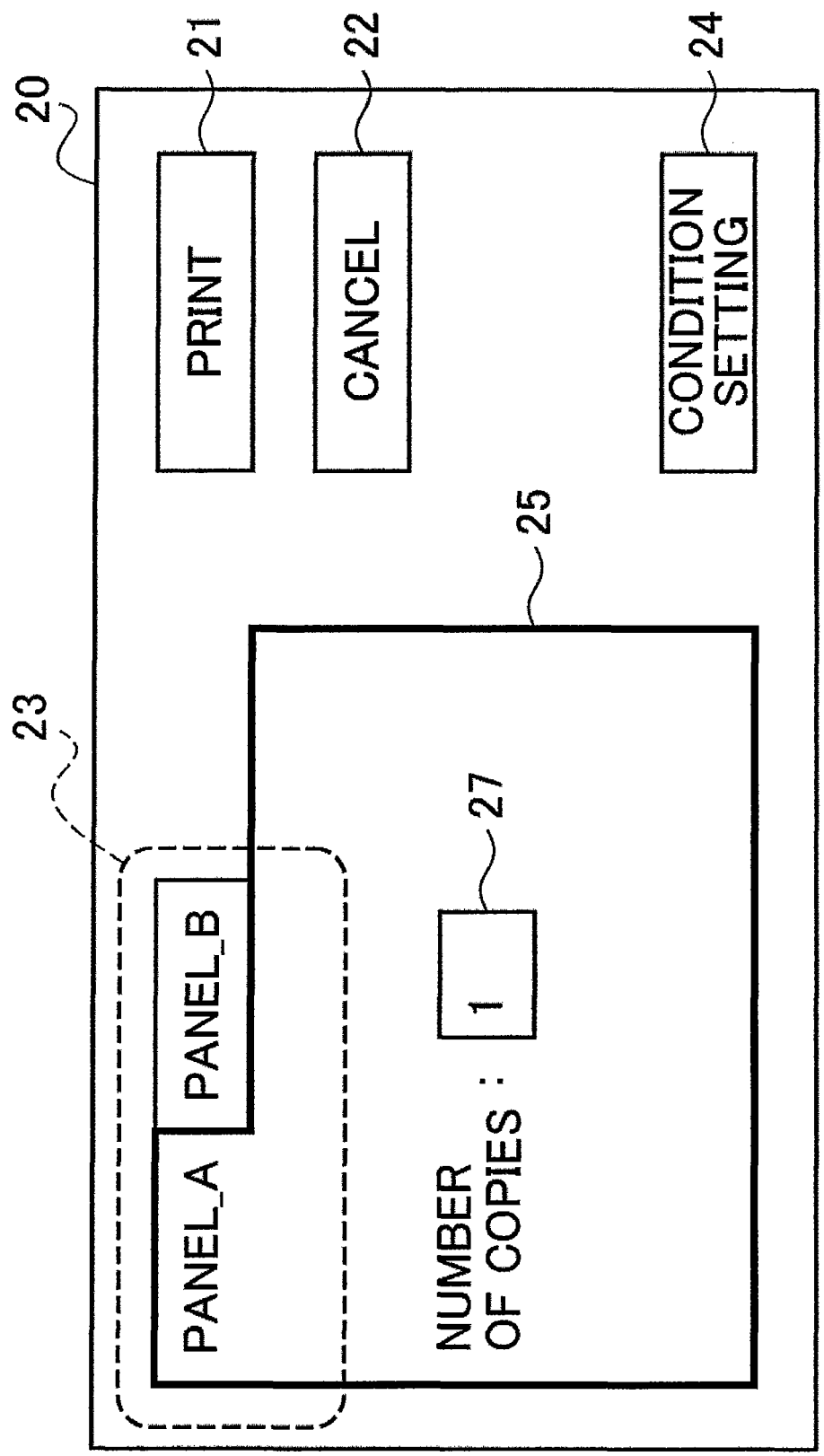
FIG. 2 is a schematic diagram showing an example of a printer driver's printing condition setting section, or namely, a printing dialog box in which a prescribed panel is displayed on a front side, described in the first embodiment of the invention.
Figure 3:
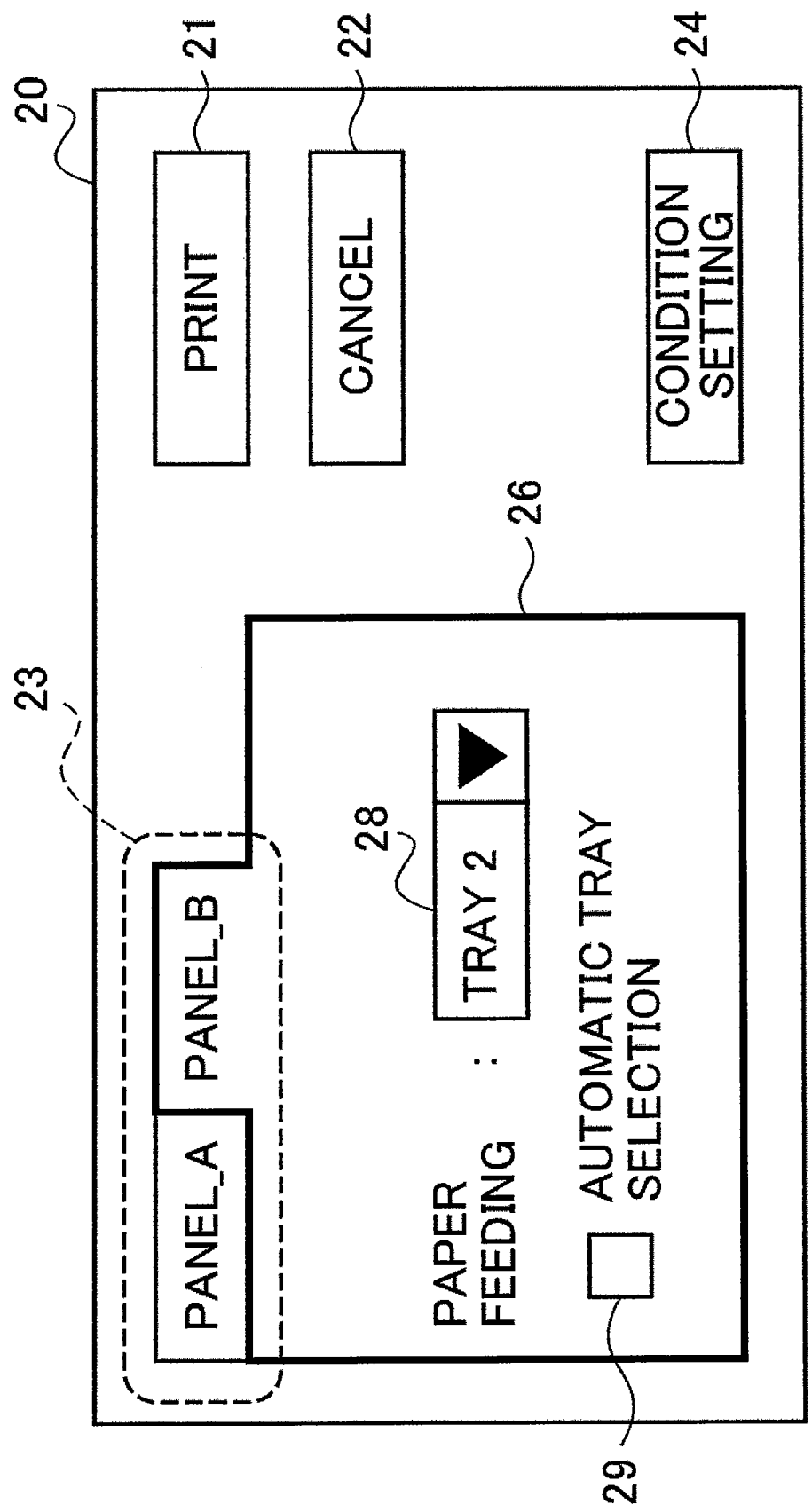
FIG. 3 is a schematic diagram showing an example of a printer driver's printing condition setting section, or namely, a printing dialog box in which a panel different from the prescribed panel is displayed on a front side, described in the first embodiment of the invention.

FIG. 2 is a printing dialog box as an example of the printing condition setting section, and FIG. 3 is a printing dialog in a case where another panel is displayed. As shown in FIG. 2, a printing dialog box 20 serving as the printing condition setting section 12 includes a "panel_A25" and a "panel_B26" as printing setting panels, and either one of the printing setting panels is displayed on a front side of the screen by choosing one of tabs 23 by user's manipulation. The "panel_A25" is furnished with a copy number setting text editing box 27 for setting a number of copies to be printed. The "panel_B26" is furnished with a paper feeding setting pull-down menu 28 for selecting trays from which the paper is fed in the printer 101 and with a automatic selection tray setting check box 29 for automatically selecting a tray from which the paper is fed.

The types of such setting items can be chosen arbitrarily from such as, e.g., radio buttons, check boxes, text editing boxes, and pull-down menus according to usage.

This printing dialog box 20 is furnished with a printing button 21, a cancel button 22, and a condition setting button 24. The printing button 21 is a button for executing printing process, and executes printing when pushed down by user's manipulation. The cancel button 22 is a button for stopping execution of printing. The condition setting button 24 is a button for setting a calculating condition for calculating a frequency, and a calculating condition setting screen 30 serving as an example of the judgment rule setting section 13, as described below, is displayed upon pushing down the condition setting button 24.

The judgment rule setting section 13 is a setting screen for setting a calculating condition for calculating a frequency of changes of the setting items. This frequency is a value about the number of times of changes of the printing condition entered into the setting items at the printing condition setting section 12 during a prescribed period of time, and is indicated by a changing number of times of each setting item with respect to the changing total number of printing condition. The judgment rule setting section 13 sets a prescribed period of time as a calculating condition when the frequency is calculated.

Figure 4:
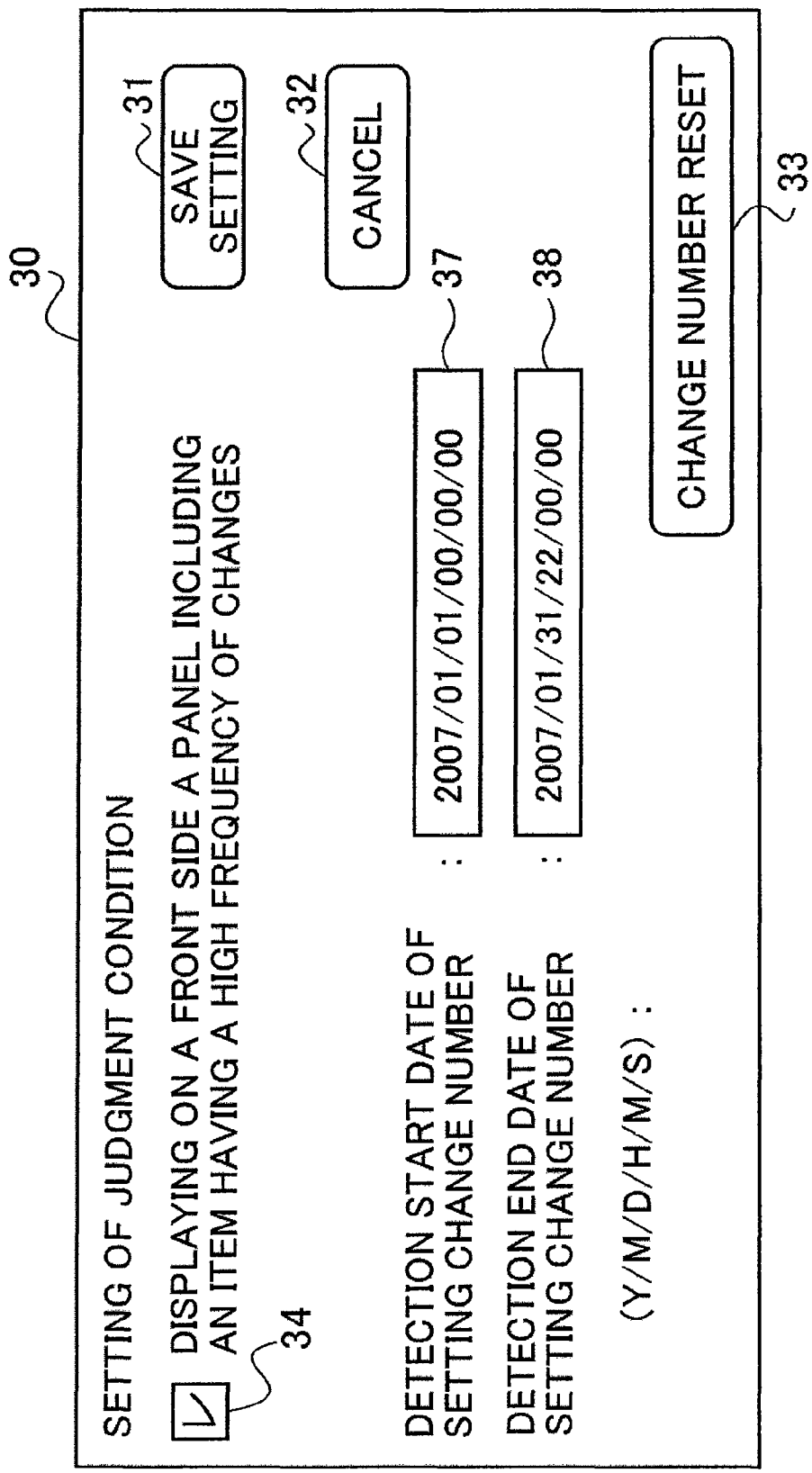
FIG. 4 is a schematic diagram showing a calculation condition setting box as an example of a judgment rule setting section of the printer driver described in the first embodiment of the invention.

FIG. 4 shows a calculating condition setting screen as an example of the judgment rule setting section. The calculating condition setting screen 30 serving as the judgment rule setting section 13 is displayed where the condition setting button 24 of the printing dialog box 20 described above is pushed down. The calculating condition setting screen 30 is furnished with a check box 34, a detection start date text editing box 37, a detection end date text editing box 38, a setting save button 31, a cancel button 32, and a reset button 33 of the changing number of times.

The check box 34 is a box selecting as to whether the panel having a setting item of the high frequency is displayed on a front side based on the frequency of changes when the printing dialog box 20 is displayed. If the check is made by the user, the panel having the setting item of the high frequency is displayed on the front side. Day and time to start the calculation of the frequency of changes is entered in the detection start date editing box 37, and a change from the default setting at the setting item is detected by the detecting section 4 from the entered day and time, thereby starting calculation of the frequency at the frequency calculating section 5. Day and time to end the calculation of the frequency of changes is entered in the detection end date text editing box 38, and a change from the default setting at the setting item is detected by the detecting section 4 from the entered day and time, thereby performing calculation of the frequency at the frequency calculating section 5. It is to be noted that those entries of day and time can be done with other selective inputs, such as e.g., pull-down menu or the like.

The setting save button 31 is a button for receiving the entered calculating condition and for executing detection of changes and calculation of frequency based on the entered calculating condition, and when the setting save button 31 is pushed by user's manipulation, the calculating condition is stored in the judgment rule storing section 7 as described below. The cancel button 32 is a button for stopping setting of the calculating condition. The reset button 33 for change number of times is a button for resetting the change number of the printing condition used for frequency calculation, and when the reset button 33 for the change number is pushed down, the change number of the printing setting storing section 6 as described below becomes zero.

The displaying section 2 includes a panel displaying section 10 serving as a panel displaying means, and a judgment rule displaying section 11 serving as a judgment rule displaying means. The panel displaying section 10 displays the printing condition setting section 12 displayed during printing process. At that time, the printing condition setting section 12 is displayed so that the printing setting panel judged at the judging section 8 as a panel to be displayed on the front side of the printing condition setting section 12 is placed on the front side. The default settings of the respective setting items of the printing condition setting section 12 are received from the printing setting storing section 6, and are displayed at corresponding setting items.

The judgment rule displaying section 11 displays the judgment rule setting section 13 displayed when the calculating condition of frequency is set. For example, when the condition setting button 24 of the printing dialog box 20 is pushed down, the judgment rule displaying section 11 displays the calculating condition setting screen 30. At that time, the judgment rule displaying section 11 receives the default settings of the respective setting items of the judgment rule setting section 13 from the judgment rule storing section 7, thereby displaying the corresponding setting items.

The memorizing section 3 includes a printing setting storing section 6 serving as printing setting storing means, a judgment rule storing section 7 serving as judgment rule storing means, a judgment result storing section 9 as a judgment result storing means, and a frequency storing section 15 serving as a frequency storing section. As shown in FIG. 5, the printing setting storing section 6 stores the default settings of the respective setting items of the printing condition setting section 12, a change number of times from the default settings, and a total change number of time at the printing condition setting section 12 counted at each change.

More specifically, a panel identification number (p_No.) at the printing setting storing section 6 is an identification number assigned to the printing setting panel of the printing condition setting section 12. A setting item identification number (item_No.) is an identification number assigned to setting items for each printing setting panel. A setting item name (item_Name [p_No.] [item_No.]) is a name of the setting item. The default setting (def_set[p_No.] [item_No.]) is a printing setting to be entered first in the setting items when the printing condition setting section 12 is displayed. The change number of time of each setting item (count [p_No.] [item_No.]) is a value incremented when a change from the default setting is detected with the detecting section 4. The total change number of times (count_d) is a value incremented when a change from the default setting is detected with the detecting section 4.

As shown in FIG. 6, the judgment rule storing section 7 stores the default setting of the respective items of the judgment rule setting section 13 and the present calculating condition. Specifically, a rule identification number (rule_No.) at the judgment rule setting storing section 7 is an identification number assigned to the setting items for setting the calculating condition. A rule name (rule[rule_No.]) is a name of the setting items for setting the calculating condition. A default setting (def_rule[rule_No.]) is a calculating condition entered first in the setting items when the judgment rule setting section 13 is displayed. A present setting (set_rule[rule_No.]) is a calculating condition presently set by setting at the judgment rule setting section 13.

As shown in FIG. 7, the judgment result storing section 9 stores information regarding the printing setting panel to be displayed on the front side of the printing condition setting section 12. More specifically, the panel identification number, corresponding to a printing setting panel judged as high frequency of changes from the default setting at the printing condition setting section 12 with the judging section 8, is stored in the panel index (p_No.) of high frequency setting change in the judgment result storing section 9. The default panel index (def_p_No.) stores, for a printing setting panel displayed on the front side of the printing condition setting section 12 when the frequency of changes is not calculated, the panel identification number corresponding thereto. The stored panel identification number corresponds to an identification number stored in the panel identification number (p_No.) of the printing setting storing section 6.

As shown in FIG. 8, the frequency storing section 15 stores the frequency of each setting item calculated at the frequency calculating section 5. More specifically, a panel identification number (p_No.) at the frequency storing section 15 is an identification number assigned to the printing setting panel of the printing condition setting section 12 in substantially the same way as the printing setting storing section 6. The setting item identification number (item_No.) is an identification number assigned to the setting items for each printing setting panel in substantially the same way as the printing setting storing section 6. The frequency of changes of each setting item (ave [p_No.] [item_No.]) is a value indicated with the change number of times for each setting item (count [p_No.] [item_No.]) with respect to the total change number of times (count_d) stored in the printing setting storing section 6.

The detecting section 4 compares the printing condition set at the printing condition setting section 12 with the default setting stored in the printing setting storing section 6, and detects occurrence of change from the default setting for each setting item. For example, when the printing button 21 of the printing dialog box 20 is pushed down, the detecting section 4 performs this detection. The change number of time (count [p_No.] [item_No.]) of the changed setting item is incremented upon read out of the printing setting storing section 6.

The frequency calculating section 5 calculates the frequency of changes for each setting item based on the change number of time of the respective setting items and total change number stored in the printing setting storing section 6, and stores in the frequency storing section 15.

The judging section 8 judges the printing setting panel to be displayed on the front side of the printing condition setting section 12 according to the frequency of changes stored in the frequency storing section 15, and stores in the judgment result storing section 9 the panel identification number (p_No.) corresponding to the printing setting panel to be on the front side. The judging section 8 as described in the first embodiment renders the printing setting panel having the highest frequency setting item displayed on the front side of the printing condition setting section 12.

The controller 14 transmits to the printer 101 the printing data, the printing settings, and other additional information necessary to make printing, as transmission data, where the printing setting is set at the printing condition setting section 12 and where the user executes printing process. The controller 14 controls entire processes of the printer driver 102.

The printer 101 connected to the personal computer 100 has a receiving section 41, an analyzing section 42, an outputting section 43, and a controller 44. The receiving section 41 receives transmission data transmitted from the controller 14 of the personal computer 100. The analyzing section 42 analyzes the transmission data received at the receiving section 41 and converts the printing data so as to make printing executed based on the set printing condition. The outputting section 43 makes printing on a recording medium based on the printing data converted at the analyzing section 42. The controller 44 controls the entire processes of the printer 101.

Figure 9:
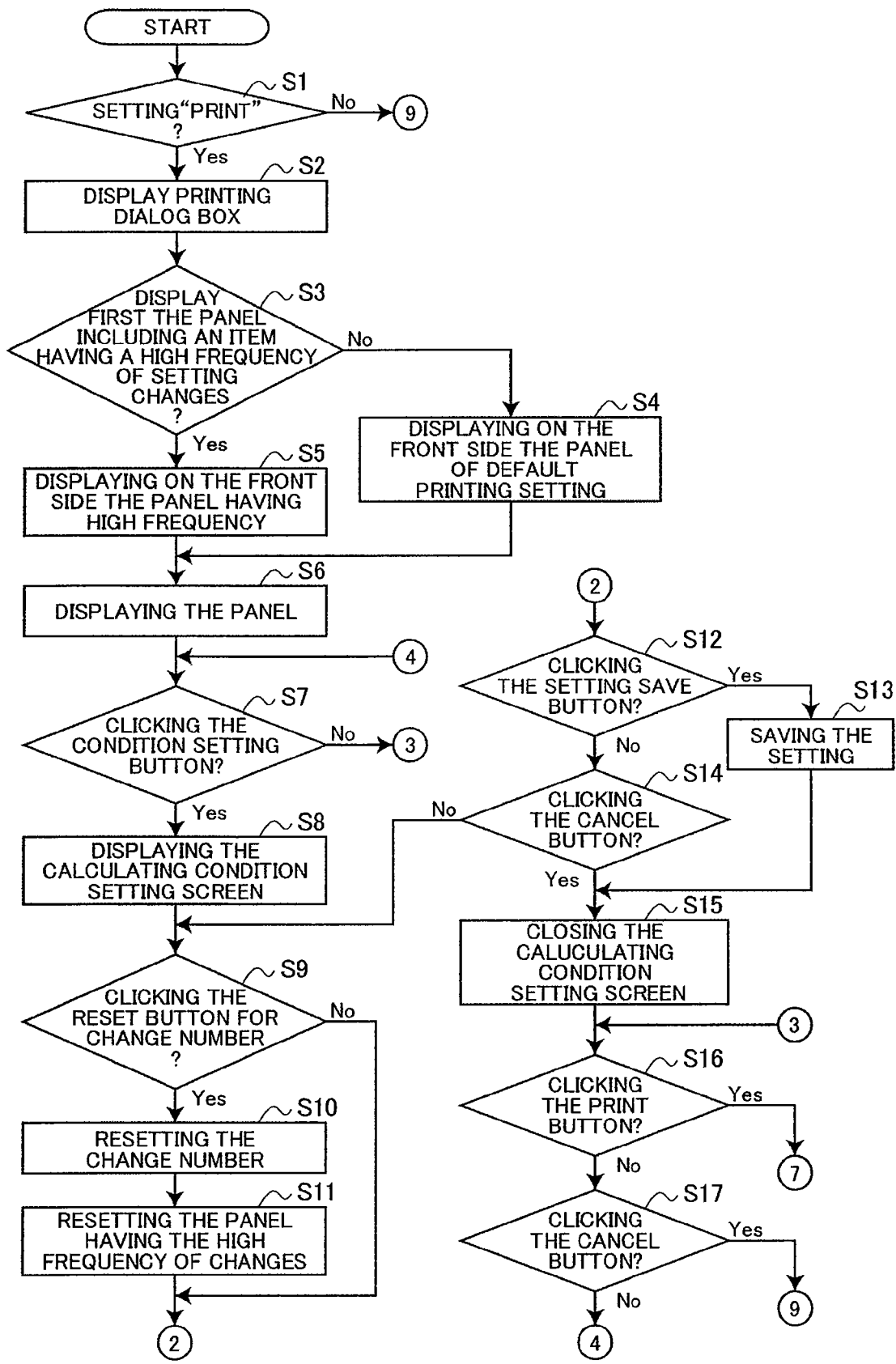
FIG. 9 is a flowchart showing a processing flow of the printer driver described in the first embodiment of the invention.
Figure 10:
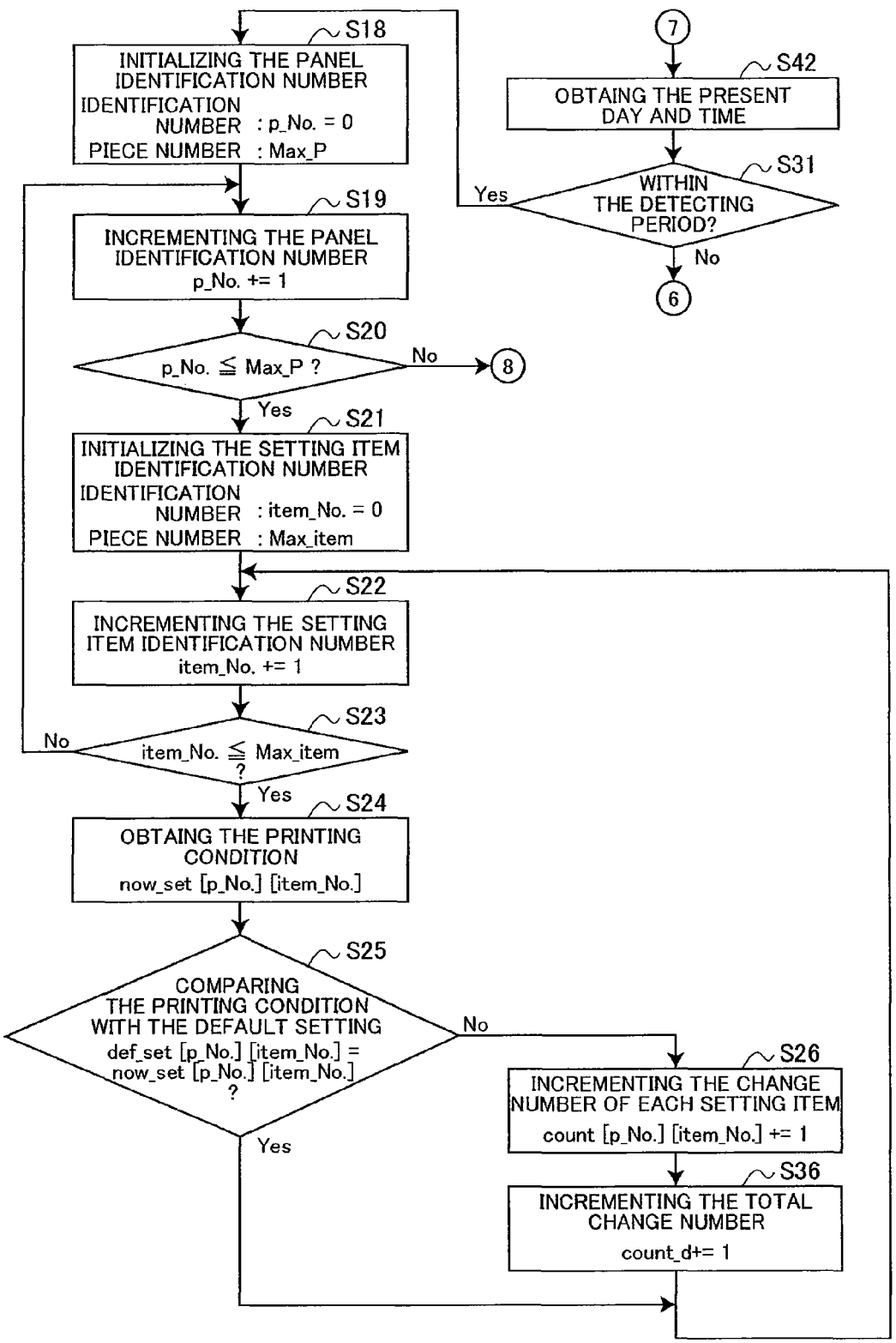
FIG. 10 is a flowchart showing a processing flow of the printer driver described in the first embodiment of the invention.
Figure 11:
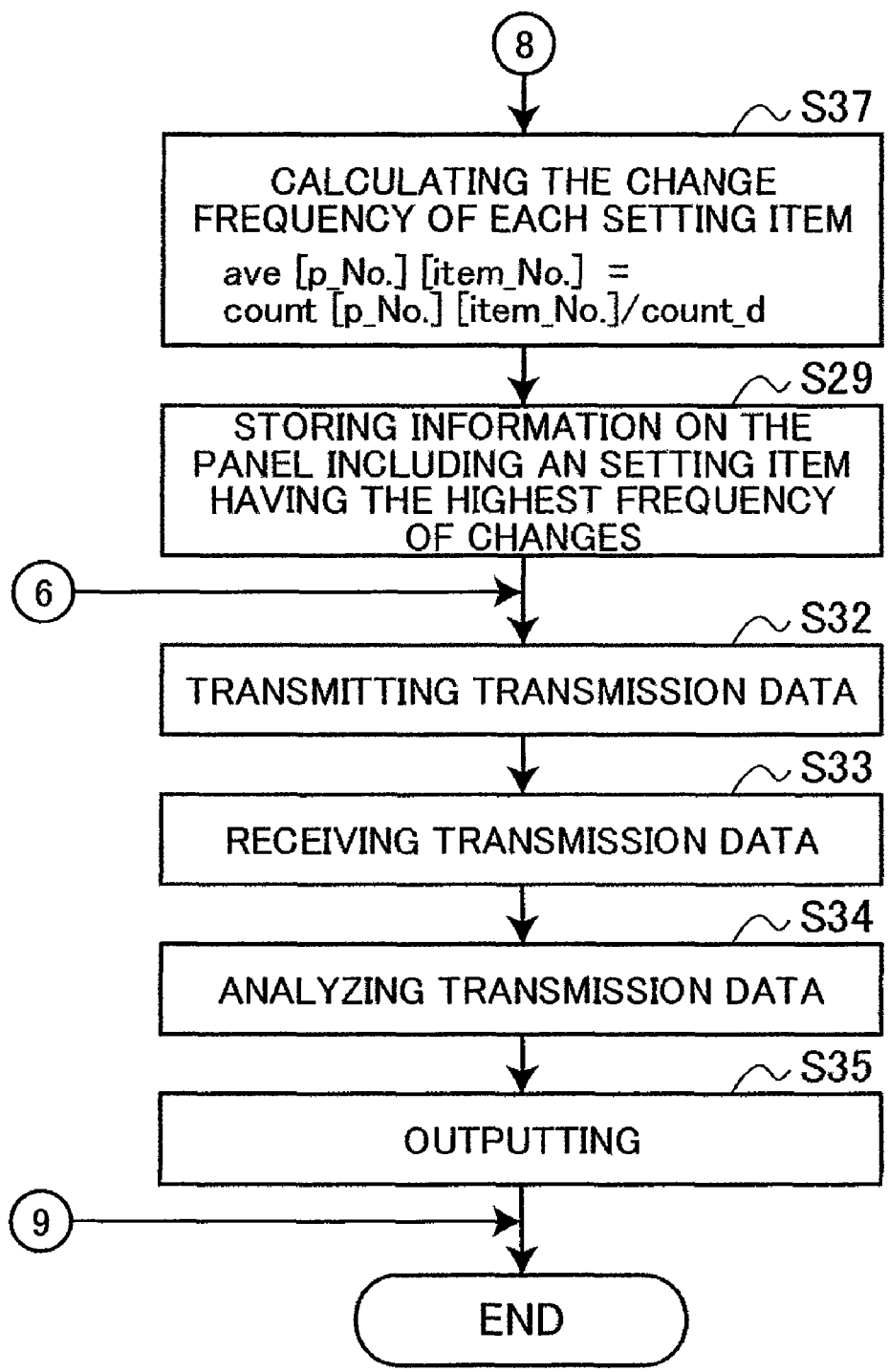
FIG. 11 is a flowchart showing a processing flow of the printer driver described in the first embodiment of the invention.

Next, processing operations of the printer driver 102 and the personal computer 100 having the printer driver 102 in the first embodiment are described with reference to flowcharts shown in FIGS. 9 to 11 in exemplifying a structure displaying the printing dialog box 20 serving as the printing condition setting section 12 and the calculating condition setting screen 30 serving as the judgment rule setting section 13.

Where a user selects printing from the menu of the application, the controller 14 of the printer driver 102 recognizes this selection (step S1), and the panel displaying section 10 displays the printing dialog box 20 (step S2). It is judged at that time as to whether to display the printing setting panel including a setting item having a high frequency of changes stored in the judgment rule storing section 7 or to display the printing setting panel of the default setting (step S3); the printing setting panel displayed on the front side of the printing dialog box 20 is determined based on that judgment (step S4 or step S5); the panel displaying section 10 displays the printing dialog box 20 so that the determined printing setting panel is displayed on the front side (step S6).

For example, as shown in FIG. 6, where the present setting of the judgment rule storing section 7 is to display a panel including an item having a high frequency of changes, "panel_B26" is made as the printing setting panel displayed on the front side from [2] of the panel identification number (p_No.) stored as a panel index having a high setting frequency in the judgment result storing section 9 (step S5). If a panel including an item having a low frequency of changes is not to be displayed, "panel_A25" is made as a printing setting panel displayed on the front side (step S4) from [1] of the panel identification number (def_p_No.) stored as the default panel index in the judgment result storing section 9.

After the printing dialog box 20 is displayed, the controller 14 confirms as to whether the user pushes down the condition setting button 24 of the printing dialog box 20 (step S7), and if the button is pushed down, the judgment rule displaying section 11 displays the calculating condition setting screen 30 (step S8).

After the calculating condition setting screen 30 is displayed, the controller 14 confirms as to whether the reset button 33 of the change number of times is pushed down (step S9), and if the button is pushed down, the change number of times is reset (step S10) so as to render the change number of times (count [p_No.] [item No.] of each setting item stored in the printing setting storing section 6. The panel having a high frequency of setting changes is reset to render zero the panel identification number (p_No.) stored as a panel index having a high frequency of setting changes in the judgment result storing section 9 (step S11).

The controller 14 confirms as to whether the setting save button 31 is pushed down (step S12), and if the button is pushed down, the calculating condition set at the respective setting items of the calculating condition setting screen 30 is saved (step S13). The set calculating condition is at that time stored in boxes of the judgment rule storing 7 corresponding to the respective setting items. After the calculating condition is saved, the judgment rule displaying section 11 closes the calculating condition setting screen 30 (step S15).

The controller 14 further confirms as to whether the cancel button 32 is pushed down (step S14), and if the button is pushed down, the judgment rule displaying section 11 closes the calculating condition setting screen 30 (step S15).

In a situation that the calculating condition setting screen 30 is not displayed, the controller 14 confirms as to whether the printing button 21 is pushed down, and obtains the present day and time (step S42). It is to be noted that the controller 14 confirms as to whether the cancel button 22 is pushed down (step S17) and that if the button is pushed down, the panel displaying section 10 stops printing upon closing the printing dialog box 20.

After the printing button 21 is pushed down and the present day and time is obtained, the controller 14 confirms the detection start day and time of the setting change number of times stored as the present setting of the judgment rule storing section 7 and the detection end day and time of the setting change number of times, and confirms whether the day and time obtained at step S42 is in this range (step S31). For example, as shown in FIG. 6, in a case where the present setting of the judgment rule storing section 7 is that the detection start day and time is 2007/01/01 (y/m/d) 00:00:00 (h/m/s) and that the detection end day and time is 2007/01/31 (y/m/d) 22:00:00 (h/m/s), if the day and time obtained at step S42 is 2007/1/15 (y/m/d) 9:50:00 (h/m/s), it is confirmed that it is within the detection period, and if the obtained day and time is 2007/02/01 (y/m/d) 15:00:00 (h/m/s), it is confirmed that it is out of the detection period.

In a case that it is out of the detection period, the controller 14 produces transmission data without calculating the change frequency regardless occurrences of the changes of the printing condition from the default setting. The controller 14 transmits the transmission data to the printer 101 (step S32). The receiving section 41 of the printer 101 receives the transmission data after the transmission data is sent (step S33). The analyzing section 42 analyzes the transmission data (step S34), and the outputting section 43 outputs data based on the analyzed data (step S35).

Where it is within the detection period, the controller 14 makes processing for calculating the frequency of changes. In this processing, the detecting section 4 compares one by one the default setting stored in the printing setting storing section 6 with printing condition set at the printing dialog box, and detects the change number of time for each setting item. The detecting section 4 first renders zero the value p_No. indicating the panel identification number as initializing the panel identification number, and obtains a piece number Max_P of the printing setting panels from the printing setting storing section 6 (step S18). For example, the printing dialog box 20 has the piece number Max_P equal two because of having two printing setting panels. The detecting section 4 subsequently increments the panel identification number (step S19). After this incrementing, the detecting section 4 compares the panel identification number with the piece number Max_P of the printing setting panels and confirms as to whether the number p_No. is not more than the value Max_P (step S20).

In a case where the number p_No. is not more than the value Max_P at step S20, the detecting section 4 renders zero the value [item_No.] indicating setting item identification number as initializing the setting item identification number, and obtains from the printing setting storing section 6 the piece number Max_item of the setting item of the printing setting panel to which the identification number having a value coinciding to the present panel identification number p_No. is assigned (step S21). For example, At the printing dialog box 20, the value Max_item becomes one because the number of the setting items is one in a case of "panel A25", whereas the value Max_item becomes two because the number of the setting items is two in a case of "panel B26." The detecting section 4 next increments the setting item identification number (step S22). After incrementing, the detecting section 4 compares the setting item identification number with the piece number of the setting items, and confirms as to whether the number p_No. is not more than the value Max_item (step S23).

In a case where the number p_No. is not more than the value Max_item at step S23, the presently set printing condition is obtained from the printing dialog box 20 (step S24). The printing condition (now_set[p_No.] [item_No.]) set at the setting item corresponding to the panel identification number p_No. and the setting item identification number item_No. is obtained. After the printing condition is obtained, the detecting section 4 compares the default setting (def_set [p_No.] [item_No.]) of the setting item corresponding to the incremented panel identification number p_No. and the setting item indentification number item_No. with the obtained printing condition, and confirms as to whether the value (def_set[p_No.] [item_No.]) is equal to the value (now_set[p_No.] [item_No.]) at step S25. In a case where the value (def_set [p_No.] [item_No.]) is equal to the value (now_set[p_No.] [item_No.]), the operation goes to step S22 to confirm as to whether occurrence of changes at other setting items because there is no change from the default setting.

In a case where the value (def_set[p_No.] [item_No.]) is not equal to the value (now_set[p_No.] [item_No.]), the detecting section 4 increments the change number of times of the setting item corresponding to the panel identification number p_No. and the setting item identification number item_No stored in the printing setting storing section 6 (step S26). After incrementing, the detecting section 4 increments the total change number of time stored in the printing setting storing section 6 (step S36). After incrementing of the total change number, the operation goes to step S22 to confirm as to whether occurrence of changes at other setting items.

For example, where the printing dialog box 20 does settings as shown in FIGS. 2, 3, the value p_No. becomes equal to one upon incrementing of the panel number (step S19) after the panel identification number is initialized (step S18) where a comparison with the default setting stored in the printing setting storing section 6 is made. Because the piece number Max_P of the printing setting panel is equal to two, the value p_No. becomes not more than the number Max_P (step S20), and the value item_No. becomes equal to one (step S22) upon incrementing after the setting item identification number is initialized (step S21). Since the printing setting panel indicated by the panel identification number having a value equal to one is "panel_A25" shown in FIG. 2, the piece number Max_item of the setting item stored in the "panel A25" is equal to one, and the value item_No. is not more than the value Max_item (step S23). Subsequently, the detecting section 4 obtains one as the printing condition set at the setting item indicated by the incremented value p_No., which is equal to one, and the incremented value item_No. which is equal to one (step S24). The detecting section 4 obtains one in substantially the same way by reading out the default setting of the setting item indicated by the value p_No., which is equal to one, and the value item_No. which is equal to one, from the printing setting storing section 6. The detecting section 4 compares the obtained printing condition with the default setting, and judges that the value def_set[1] [1] is equal to now_set[1] [1] (step S25). Therefore, the detecting section 4 does not increment the change number of times.

The detecting section 4 subsequently increments the setting item identification number (step S22). This operation makes the value item_No. equal to two. Because at "panel_A25" the value Max_item is equal to one, the value item_No. is more than the value Max_item (step S23), and the value p_No. becomes equal to two by incrementing the panel identification number (step S19). Because the piece number Max_P of the printing setting panel is equal to two, the value p_No. is not more than the value Max_P (step S20), and the value item_No. is equal to one by incrementing the value (step S22) after initializing the setting item identification number (step S21). Since the printing setting panel indicated by the panel identification number p_No. equal to two is "panel_B26" as shown in FIG. 3, the piece number Max_item of the setting items formed at the "panel_B26" is equal to two, and the value item_No. becomes not more than the value Max_item (step S23). The detecting section 4 obtains the tray 2 as the printing condition set at the setting item indicated by the incremented value p_No., which is equal to two and by the value item_No., which is equal to one (step S24). The detecting section 4 reads out the default setting of the setting item indicated by the value p_No., which is equal to two, and by the value item_No., which is equal to one, from the printing setting storing section 6, thereby obtaining the tray 1. The detecting section 4 judges the value def_set [2] [1] is not the value now_set [2] [1] (step S25). Therefore, the detecting section 4 increments the change number of times (step S26) and the total change number of times (step S36).

The setting item identification number is incremented to render the value item_No. equal to two (step S22), and the printing condition of the setting item indicated by the value p_No., which is equal to two, and the value item_No., which is equal to two, is compared with the default setting (step S25). The detecting section 4 increments change number of times (step S26) and the total change number of times (step S36), because the value def set [2] [2] is not the value now_set [2] [2] in a case of the setting item indicated by the value p_No., which is equal to two, and the value item_No., which is equal to two. Thus, with this program, or namely this printer driver, the changes are detected from the default setting, and the change number of times can be detected.

Where the value item_No. is greater than the value Max_item at step S23, the operation goes to step S19 since it is completed to confirm occurrences of changes of the setting item formed in the printing setting panel corresponding to the incremented panel identification number p_No., and substantially the same comparison is made to other printing setting panels. Where the value p_No. is greater than the value Max_P at step S20, it is completed to confirm occurrence of changes of the entire setting items, and the frequency calculating section 5 calculates the change frequency (ave [p_No.] [item_d]) using the change number (count[p_No.] [item_No.]) and the total change number (count_d) stored in the printing setting storing section 6, or namely from a formula ave[p_No.] [item_d]=count[p_No.] [item_No.])/(count_d) (step S37). For example, the change frequency ave [2] [2] of the setting item corresponding to the value item_No. equal to two of "panel_B26" corresponding to the value p_No. equal to two, becomes 40/90 (=ave [2] [2]) based on the printing setting storing section 6 shown in FIG. 5. The calculated change frequency is stored in the frequency storing section 15 for each setting item.

After calculation of the change frequency, the judging section 8 makes reference to the frequency storing section 15, and obtains the panel identification number (p_No.) having the highest change frequency (ave [p_No.] [item_No.]). The judging section 8 stores this panel identification number (p_No) in the judgment result storing section 9 (step S29). The controller 14 produces transmission data after the storing process, and transmits the transmission data to the printer 101 (step S32). After the transmission data are sent, the receiving section 41 of the printer 101 receives the transmission data (step S33). The analyzing section 42 analyzes the transmission data (step S34), and the outputting section 43 outputs the data based on the analyzed data (step S35).

As described above, the personal computer having the printer and its printer driver as described in the first embodiment can detect, from the setting contents of the printing condition during the printing process, the changes from the default setting for each setting item, and can calculate the change frequency by detecting the number of times of the changes. The personal computer can display the printing setting panel having the setting item of the calculated high frequency of changes on the front side of the printing condition setting section 12. Where the processing described above is done at the printer 101, communication processing occurs between the personal computer 100 and the printer 101 for each time at which the printing condition setting section 12 is displayed. With the invented program, or namely the printer driver, the entire processes described above are done by the printer driver installed in the personal computer, so that no communication processing occurs. The printing setting program according to this invention reduces the load of the processes during the printing operation.

The printing setting program, as described above, can set the calculating condition favorably for calculating the change frequency from the default setting with the judgment rule setting section 11. With this structure, the setting of the calculating condition can be set again where a new frequency is preferably calculated in a situation such that, e.g., the user of the personal computer 100 is changed. The judgment rule displaying section 11 displaying the judgment rule setting section 13 allows the screen of the personal computer 100 to display the calculating condition, and as described above, this printing setting program further improves its advantages since the calculating condition for calculating the frequency can be set while the printing condition setting section 12 is displayed, Because of having the respective storing sections for memorizing the information, this program can easily perform such as, e.g., the comparison processing, and calculating processing of the frequency.

[Second Embodiment]

In the section embodiment, the program allows to calculate a change frequency of the setting items for each printing setting panel. The change frequency calculated for each printing setting panel is calculated based on the change number of times for each printing setting panel. It is to be noted that in this second embodiment, a selection can be made between judgment from the change frequency of each setting item and judgment from the change frequency of each printing setting panel, when the printing setting panel to be displayed on the front side of the printing condition setting section 12 is judged. Details of the second embodiment will be described hereinafter, but substantially the same portions as those in the first embodiment are omitted from detailed description.

The printer driver 102 and the personal computer 100 having the printer driver 102, which are described in the second embodiment, are substantially the same as those in the first embodiment except the judgment rule setting section 13, the printing setting storing section 6, the judgment rule storing section 7, and the frequency storing section 15, which are different from those in the first embodiment.

The judgment rule setting section 13, in addition to setting of a prescribed period during calculation of the frequency, sets as a calculating condition a selection either to calculate the change frequency of each setting item for making judgment from the change frequency of each setting item or to calculate change frequency of each printing setting panel for making judgment from the change frequency of each printing setting panel, when the printing setting panel displayed on the front side of the printing condition setting section 12 is judged.

Figure 12:
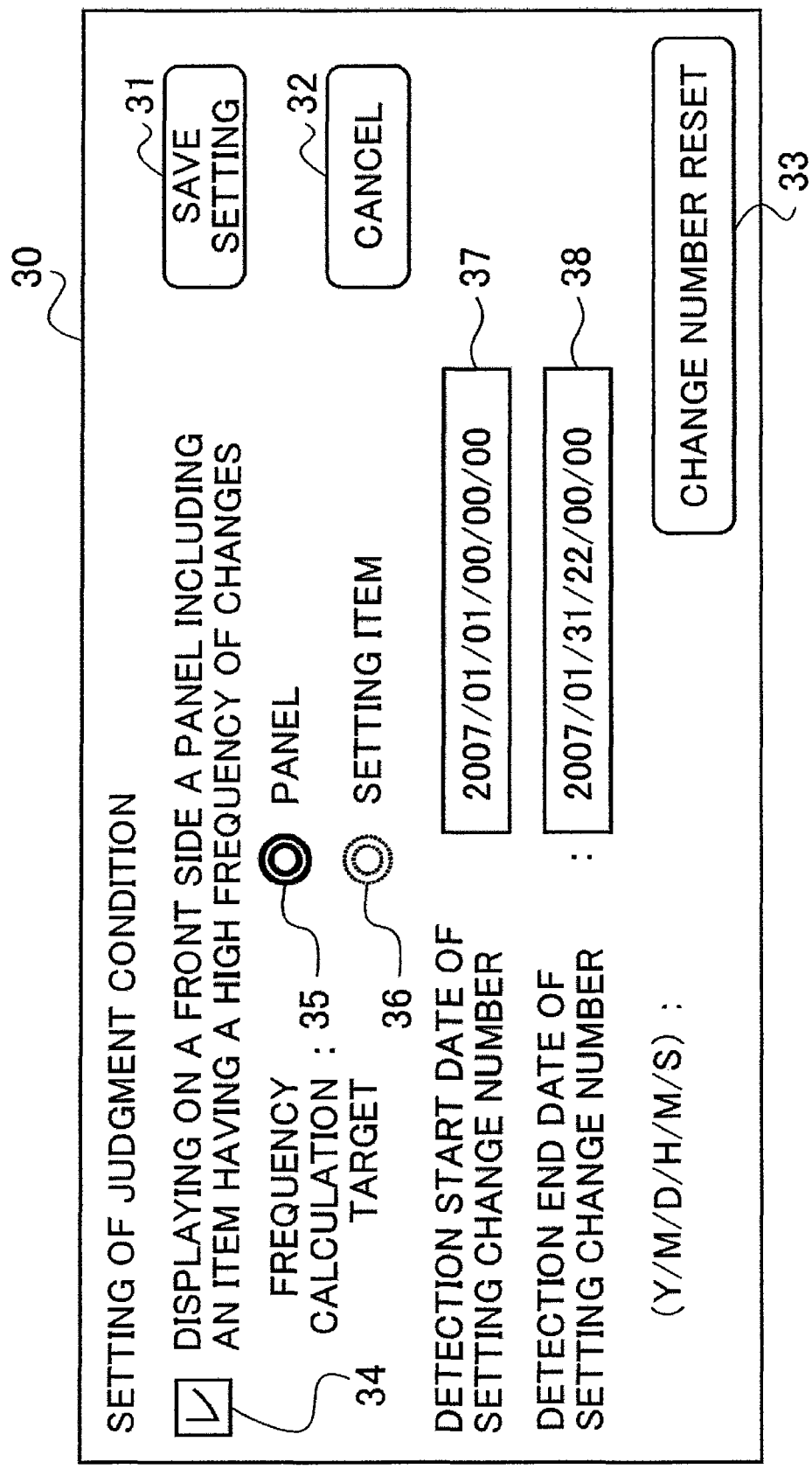
FIG. 12 is a schematic diagram showing a calculation condition setting box as an example of a judgment rule setting section of the printer driver described in the second embodiment of the invention.

FIG. 12 shows a calculating condition setting screen as an example of the judgment rule setting section. A panel radio button 35 and a setting item radio button 36 are added on the calculating condition setting screen 30 for choosing the targeted frequency when the printing setting panel displayed on the front side is judged. The change frequency of each printing setting panel is calculated at the frequency calculating section 5 by choosing the panel radio button 35, and the printing setting panel displayed on the front side is judged at the judging section 8 based on the calculated frequency. This frequency is calculated using the change number of times of the respective setting items detected when the printing condition is set. The change frequency of each setting item in substantially the same way as in the first embodiment is calculated by choosing the setting item radio button 36, and the printing setting panel displayed on the front side is judged at the judging section 8. It is to be noted that only one of the panel radio button 35 and the setting item radio button 36 can be chosen at a time.

As shown in FIG. 13, the printing setting storing section 6 further stores, in addition to the structure described in the first embodiment, the change number of times of each printing setting panel at which the number of times changed from the default setting of the setting item is counted. More specifically, the change number (count_p[p_No.] of each panel at the printing setting storing section 6 is a value incremented when the change from the default setting is detected by the detecting section 4 in substantially the same way as the change number (count[p_No.]) of each setting item.

As shown in FIG. 14, the judgment rule storing section 7 stores, in association with addition of the settings to choose the target of frequency calculation to the judgment rule setting section 13, the setting name of the calculating condition corresponding to the settings, the default setting, and the present setting. More specifically, the judgment rule setting section 13 is added with rule names relating to the panel radio button 35 and the setting item radio button 36, which are added to the calculating condition setting screen 30 as shown in FIG. 12, and stores the default setting and the present setting as corresponding to the addition.

As shown in FIG. 15, the frequency storing section 15 stores, in addition to the change frequency of the setting items, the change frequency of the each panel calculated at the frequency calculating section 5. More specifically, the change frequency (ave_p[p_No.]) of each panel at the frequency storing setting 15 is a value of each panel indicated by the change number (count_p[p_No.] of each panel with respect to the total change number (count_d) stored in the printing setting storing section 6.

Figure 16:
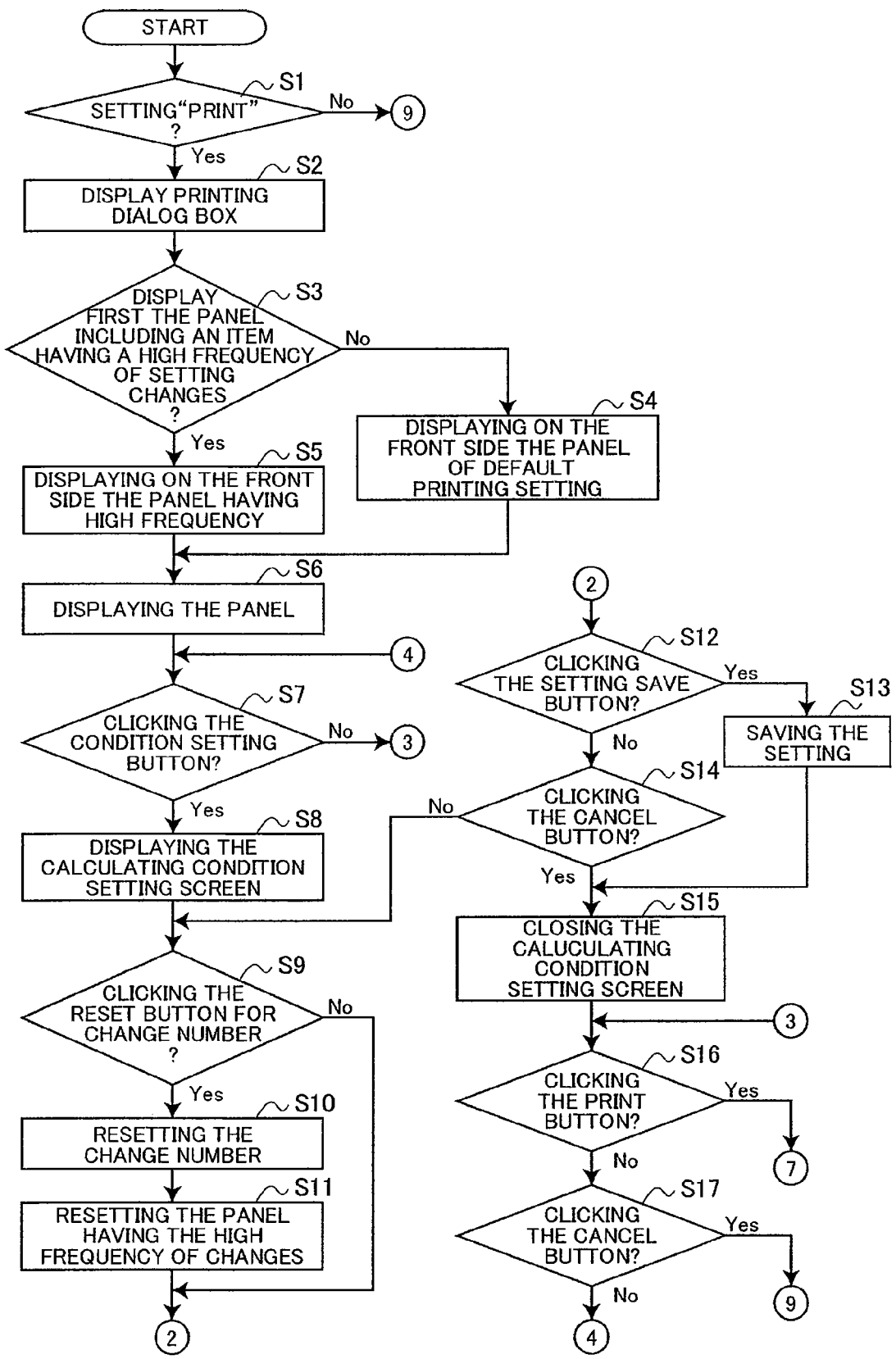
FIG. 16 is a flowchart showing a processing flow of the printer driver described in the second embodiment of the invention.
Figure 17:
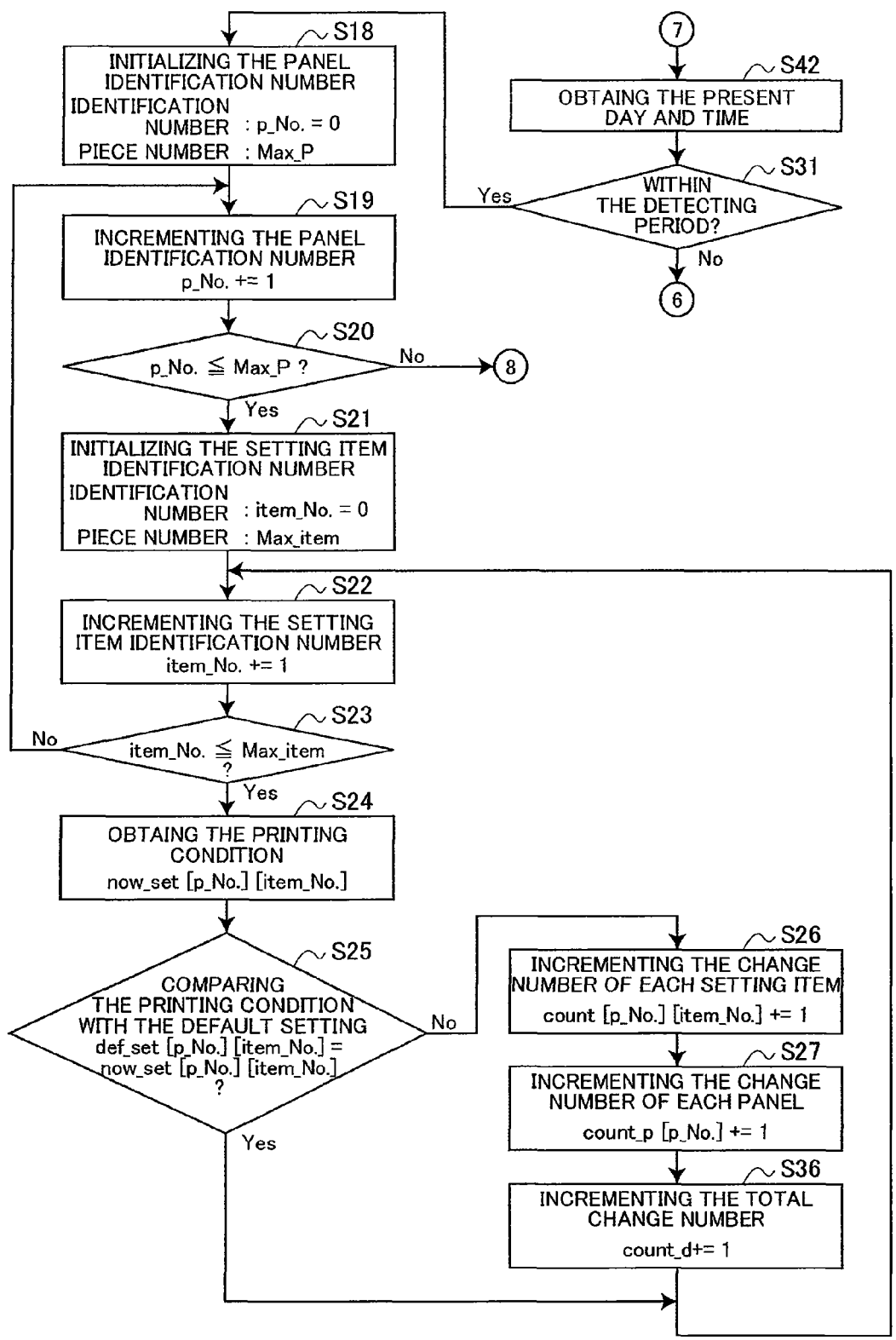
FIG. 17 is a flowchart showing a processing flow of the printer driver described in the second embodiment of the invention.
Figure 18:
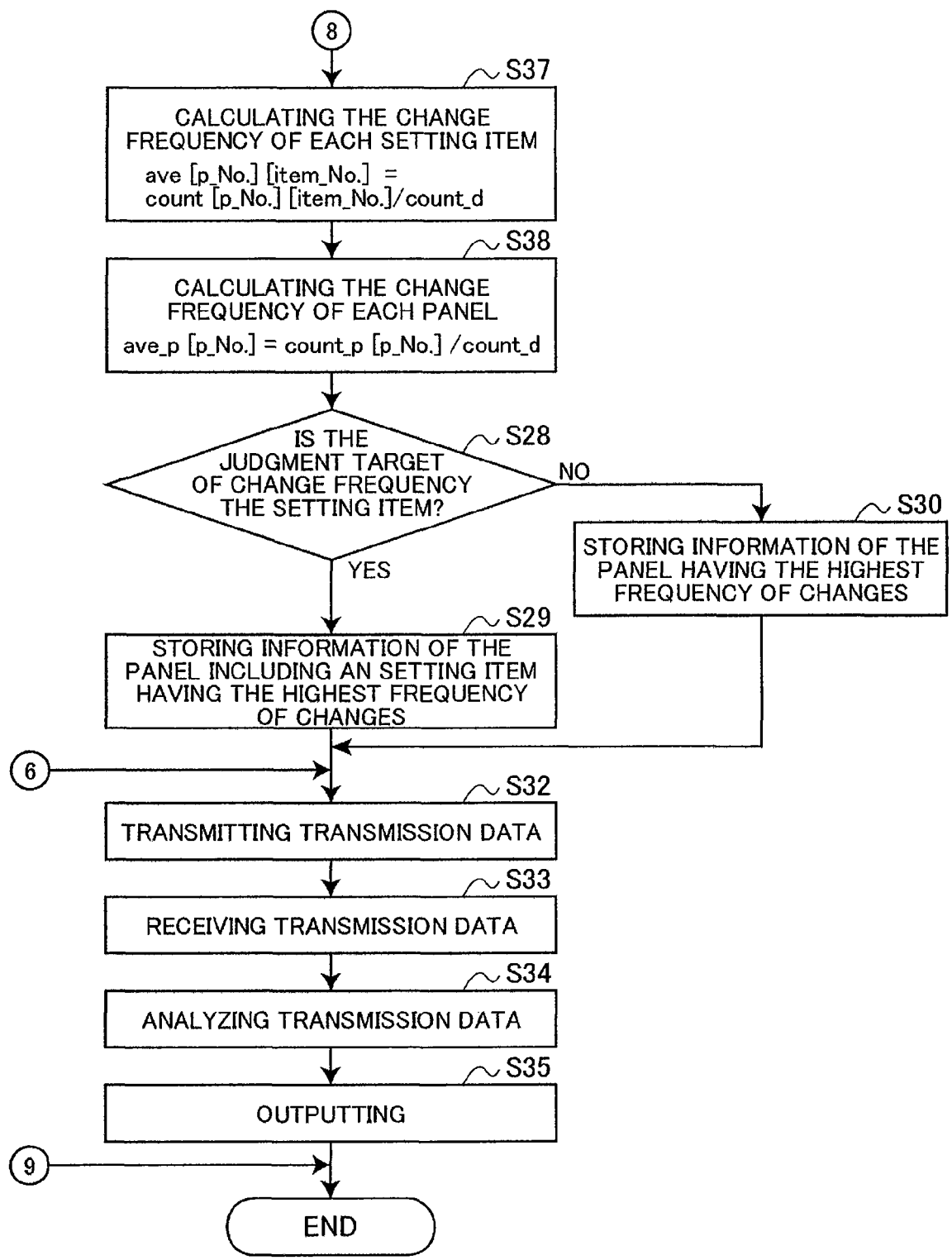
FIG. 18 is a flowchart showing a processing flow of the printer driver described in the second embodiment of the invention.

Next, processing operations of the printer driver 102 and the personal computer 100 having the printer driver 102 in the second embodiment are described with reference to flowcharts shown in FIGS. 16 to 18 in exemplifying a structure displaying the printing dialog box 20 serving as the printing condition setting section 12 and the calculating condition setting screen 30 serving as the judgment rule setting section 13. It is to be noted that the description herein is for a situation where the panel radio button 35 is selected at the calculating setting panel screen 30, or namely where the change frequency is calculated for each printing setting panel. The embodiment in which the change frequency is calculated for each setting item is substantially the same as that in the first embodiment.

Where a user selects printing from the menu of the application, the controller 14 of the printer driver 102 recognizes this selection (step S1), and the panel displaying section 10 displays the printing dialog box 20 (step S2). It is judged at that time as to whether to display the printing setting panel having a high frequency of changes stored in the judgment rule storing section 7 or to display the printing setting panel of the default setting (step S3); the printing setting panel displayed on the front side of the printing dialog box 20 is determined based on that judgment (step S4 or step S5); the panel displaying section 10 displays the printing dialog box 20 so that the determined printing setting panel is displayed on the front side (step S6).

After the printing dialog box 20 is displayed, the controller 14 confirms as to whether the user pushes down the condition setting button 24 of the printing dialog box 20 (step S7), and if the button is pushed down, the judgment rule displaying section 11 displays the calculating condition setting screen 30 (step S8).

After the calculating condition setting screen 30 is displayed, the controller 14 confirms as to whether the reset button 33 of the change number of times is pushed down (step S9), and if the button is pushed down, the change number of times is reset (step S10) so as to render the change number of times (count [p_No.] [item No.] of each setting item stored in the printing setting storing section 6. The panel having a high frequency of setting changes is reset to render zero the panel identification number (p_No.) stored as a panel index having a high frequency of setting changes in the judgment result storing section 9 (step S11).

The controller 14 confirms as to whether the setting save button 31 is pushed down (step S12), and if the button is pushed down, the calculating condition set at the respective setting items of the calculating condition setting screen 30 is saved (step S13). The set calculating condition is at that time stored in boxes of the judgment rule storing 7 corresponding to the respective setting items. After the calculating condition is saved, the judgment rule displaying section 11 closes the calculating condition setting screen 30 (step S15).

The controller 14 further confirms as to whether the cancel button 32 is pushed down (step S14), and if the button is pushed down, the judgment rule displaying section 11 closes the calculating condition setting screen 30 (step S15).

In a situation that the calculating condition setting screen 30 is not displayed, the controller 14 confirms as to whether the printing button 21 is pushed down, and obtains the present day and time (step S42). It is to be noted that the controller 14 confirms as to whether the cancel button 22 is pushed down (step S17) and that if the button is pushed down, the panel displaying section 10 stops printing upon closing the printing dialog box 20.

After the printing button 21 is pushed down and the present day and time is obtained, the controller 14 confirms the detection start day and time of the setting change number of times stored as the present setting of the judgment rule storing section 7 and the detection end day and time of the setting change number of times, and confirms whether the day and time obtained at step S42 is in this range (step S31).

In a case that it is out of the detection period, the controller 14 produces transmission data without calculating the change frequency regardless occurrences of the changes of the printing condition from the default setting. The controller 14 transmits the transmission data to the printer 101 (step S32). The receiving section 41 of the printer 101 receives the transmission data after the transmission data is sent (step S33). The analyzing section 42 analyzes the transmission data (step S34), and the outputting section 43 outputs data based on the analyzed data (step S35).

Where it is within the detection period, the controller 14 makes processing for calculating the frequency of changes. In this processing, the detecting section 4 compares one by one the default setting stored in the printing setting storing section 6 with printing condition set at the printing dialog box, and detects the change number of time for each setting item. The detecting section 4 first renders zero the value p_No. indicating the panel identification number as initializing the panel identification number, and obtains a piece number Max_P of the printing setting panels from the printing setting storing section 6 (step S18). For example, the printing dialog box 20 has the piece number Max_P equal two because of having two printing setting panels. The detecting section 4 subsequently increments the panel identification number (step S19). After this incrementing, the detecting section 4 compares the panel identification number with the piece number Max_P of the printing setting panels and confirms as to whether the number p_No. is not more than the value Max_P (step S20).

In a case where the number p_No. is not more than the value Max_P at step S20, the detecting section 4 renders zero the value [item_No.] indicating setting item identification number as initializing the setting item identification number, and obtains from the printing setting storing section 6 the piece number Max_item of the setting item of the printing setting panel to which the identification number having a value coinciding to the present panel identification number p_No. is assigned (step S21). For example, At the printing dialog box 20, the value Max_item becomes one because the number of the setting items is one in a case of "panel A25", whereas the value Max_item becomes two because the number of the setting items is two in a case of "panel_B26." The detecting section 4 next increments the setting item identification number (step S22). After incrementing, the detecting section 4 compares the setting item identification number with the piece number of the setting items, and confirms as to whether the number p_No. is not more than the value Max_item (step S23).

In a case where the number p_No. is not more than the value Max_item at step S23, the presently set printing condition is obtained from the printing dialog box 20 (step S24). The printing condition (now_set[p_No.] [item_No.]) set at the setting item corresponding to the panel identification number p_No. and the setting item identification number item_No. is obtained. After the printing condition is obtained, the detecting section 4 compares the default setting (def_set [p_No.] [item_No.]) of the setting item corresponding to the incremented panel identification number p_No. and the setting item indentification number item_No. with the obtained printing condition, and confirms as to whether the value (def_set[p_No.] [item_No.]) is equal to the value (now_set[p_No.] [item_No.]) at step S25. In a case where the value (def_set [p_No.] [item_No.]) is equal to the value (now_set[p_No.] [item_No.]), the operation goes to step S22 to confirm as to whether occurrence of changes at other setting items because there is no change from the default setting.

In a case where the value (def_set[p_No.] [item_No.]) is not equal to the value (now_set[p_No.] [item_No.]), the detecting section 4 increments the change number of times of the setting item corresponding to the panel identification number p_No. and the setting item identification number item_No stored in the printing setting storing section 6 (step S26). The detecting section 4 increments the change number of times of the printing setting panel corresponding to the panel identification number p_No. in the printing setting storing section 6 (step S27). After incrementing, the detecting section 4 increments the total change number of time stored in the printing setting storing section 6 (step S36). After incrementing of the total change number, the operation goes to step S22 to confirm as to whether occurrence of changes at other setting items.

Where the value item_No. is greater than the value Max_item at step S23, the operation goes to step S19 since it is completed to confirm occurrences of changes of the setting item formed in the printing setting panel corresponding to the incremented panel identification number p_No., and substantially the same comparison is made to other printing setting panels. Where the value p_No. is greater than the value Max_P at step S20, it is completed to confirm occurrence of changes of the entire setting items, and the frequency calculating section 5 calculates the change frequency (ave [p_No.] [item_d]) of the each setting item using the change number (count[p_No.] [item_No.]) of each setting item and the total change number (count_d) stored in the printing setting storing section 6, or namely from a formula ave[p_No.] [item_d]=count[p_No.] [item_No.])/(count_d) (step S37). Moreover, the frequency calculating section 5 calculates the change frequency (ave [p_No.] [item_d]) of the each printing setting panel using the change number (count[p_No.] [item_No.]) of each panel and the total change number (count_d) stored in the printing setting storing section 6, or namely from a formula ave[p_No.] [item_d]=count[p_No.] [item_No.])/(count_d) (step S38). For example, the change frequency ave [2] of "panel_B26" corresponding to the value p_No. becomes 70/90 (=ave [2] [2]) based on the printing setting storing section 6 shown in FIG. 13. The calculated change frequency is stored in the frequency storing section 15 for each printing setting panel. After calculation of the change frequency, confirmed are the settings of the panel radio button 35 and the setting item radio button 36 stored in the judgment rule storing section 7, and it is confirmed as to whether the target for judging the printing setting panel to be displayed on the front side of the printing dialog box 20 is the change frequency of each setting item (step S28). Where the judging target is for each printing setting panel, the judging section 8 makes reference to the frequency storing section 15, and obtains the panel identification number (p_No.) having the highest change frequency (ave [p_No.]) of each panel. The judging section 8 stores this panel identification number (p_No) in the judgment result storing section 9 (step S30). On the other hand, where the judging target is for each setting item, the judging section 8 makes reference to the frequency storing section 15, and obtains the panel identification number (p_No.) including a setting item having the highest change frequency (ave [p_No.] [item_No.]). The judging section 8 stores this panel identification number (p_No) in the judgment result storing section 9 (step S29). The controller 14 produces transmission data after the storing process, and transmits the transmission data to the printer 101 (step S32). After the transmission data are sent, the receiving section 41 of the printer 101 receives the transmission data (step S33). The analyzing section 42 analyzes the transmission data (step S34), and the outputting section 43 outputs the data based on the analyzed data (step S35). As described above, with the printer driver and the personal computer having the printer driver, which are described in the second embodiment, the change frequency calculated for each printing setting panel can be a target when the printing setting panel to be displayed on the front side of the printing condition setting section 12 is judged. A printing setting panel having a low change frequency for each setting item but having a high change frequency as the printing setting panel can be displayed on the front side. As described in the second embodiment, the printer driver can choose the judging target between each setting item and each printing setting panel, thereby improving its usability.

[Third Embodiment]

The third embodiment is to judge the printing setting panel displayed on the front side of the printing condition setting section 12 utilizing the change frequency calculated previously where the change frequency has a lower reliability due to a small number of change times, or namely during a period that the change number of times from the default setting just starts to be detected. Detail of the third embodiment is hereinafter described, and but substantially the same portions as those in the first and second embodiments are omitted from detailed description.

The printer driver 102 and the personal computer 100 having the printer driver 102, which are described in the third embodiment, are substantially the same as those in the second embodiment except the judgment rule setting section 13, the judgment rule storing section 7, and the frequency storing section 15, which are different from those in the second embodiment.

The judgment rule setting section 13, in addition to setting of a prescribed period during calculation of the frequency and to setting of change frequency to be a judging target on the printing setting panel displayed on the front side of the printing condition setting section 12, sets as a calculating condition as to whether the change frequency previously measured is utilized.

Figure 19:
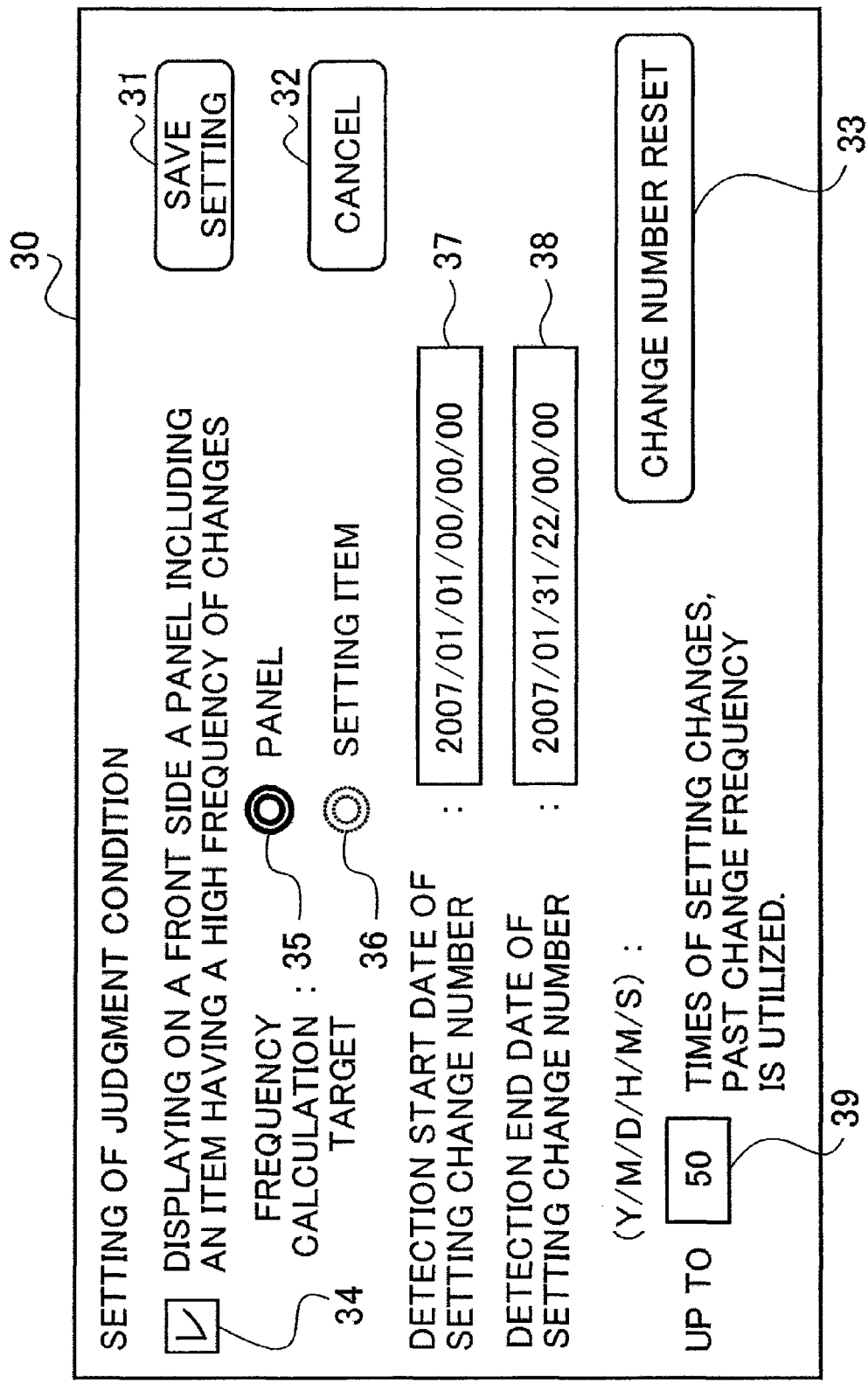
FIG. 19 is a schematic diagram showing a calculation condition setting box as an example of a judgment rule setting section of the printer driver described in the third embodiment of the invention.
Figure 22:
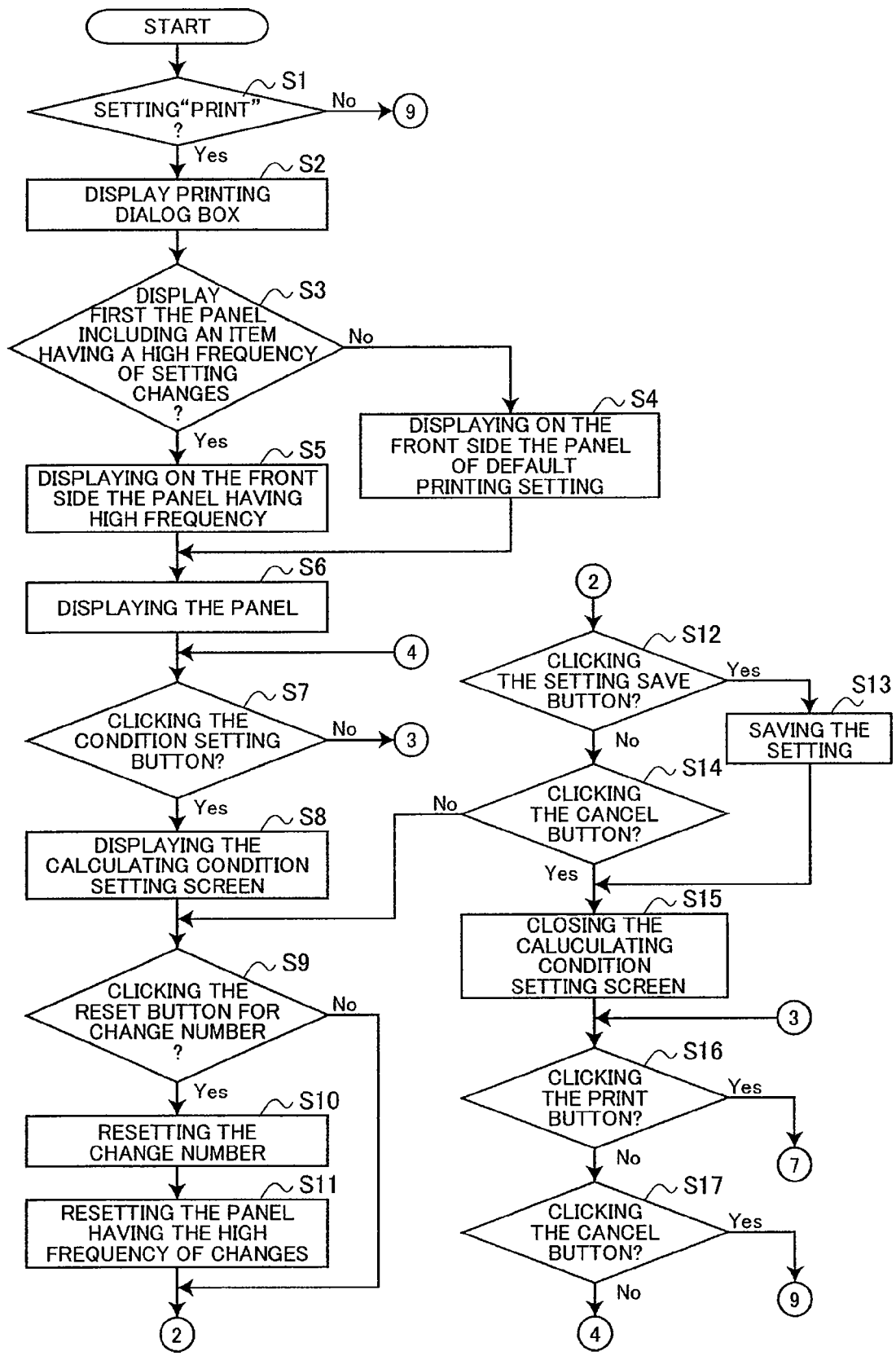
FIG. 22 is a flowchart showing a processing flow of the printer driver described in the third embodiment of the invention.
Figure 23:
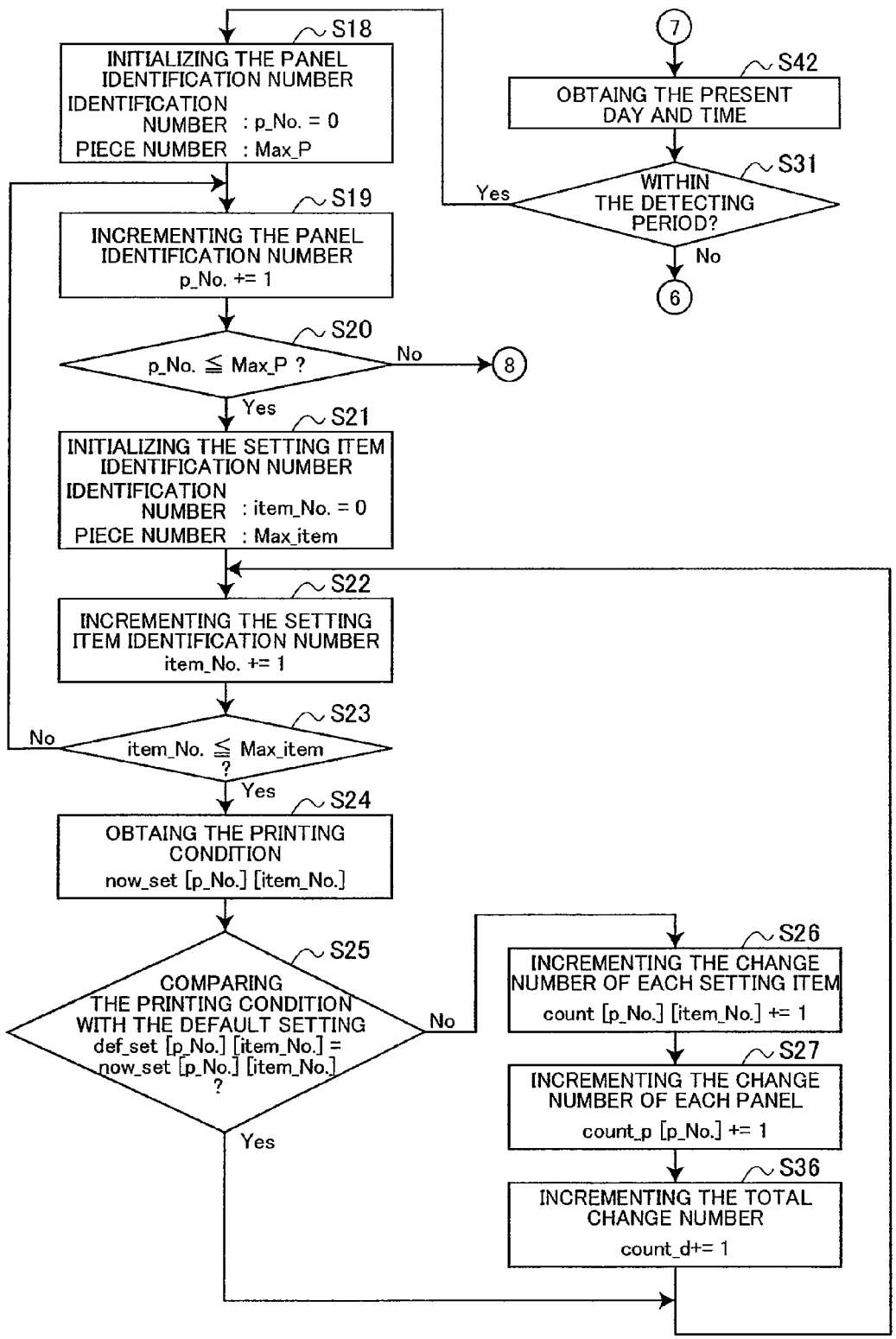
FIG. 23 is a flowchart showing a processing flow of the printer driver described in the third embodiment of the invention.
Figure 24:
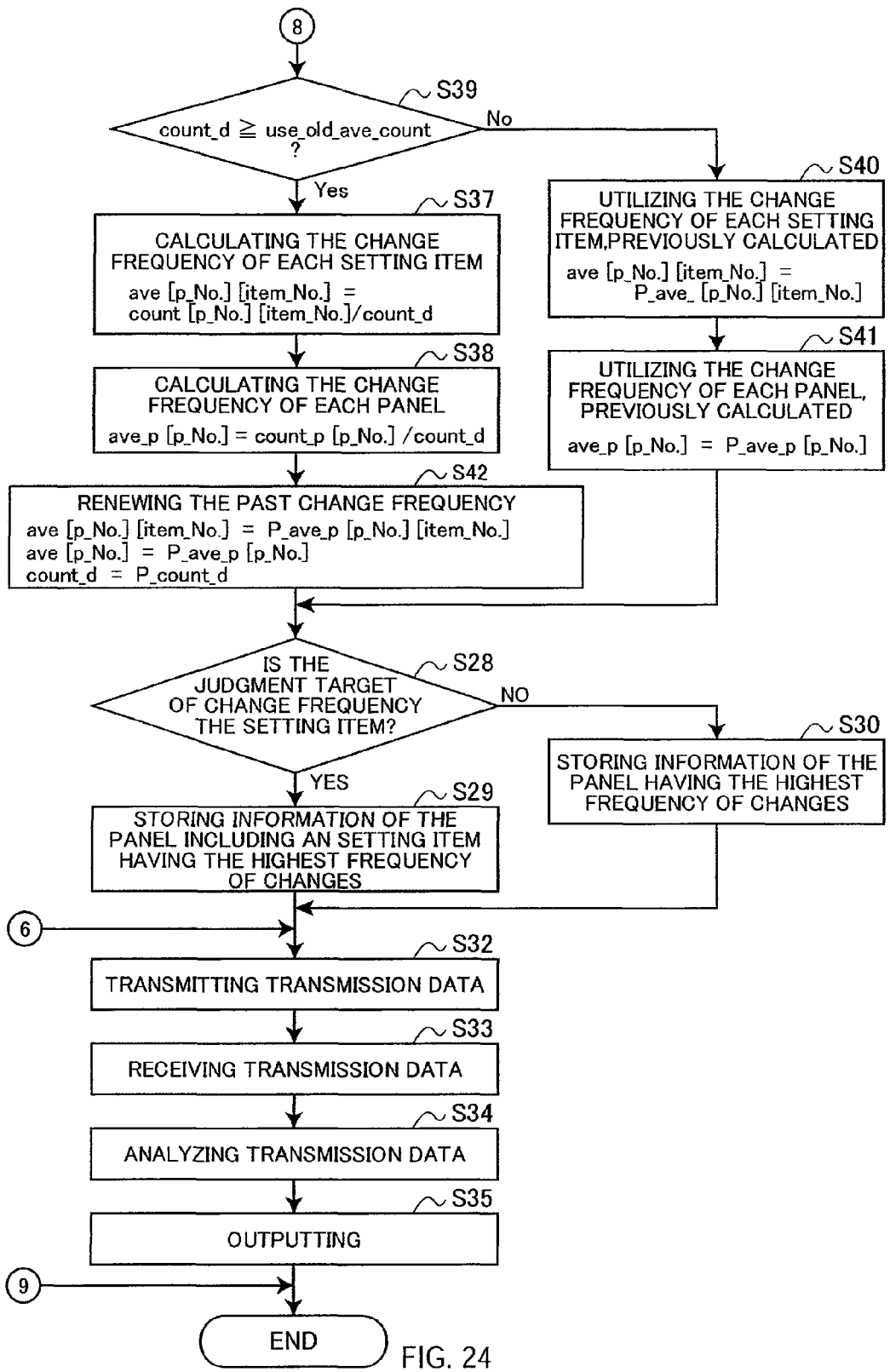
FIG. 24 is a flowchart showing a processing flow of the printer driver described in the third embodiment of the invention.

FIG. 19 shows a calculating condition setting screen as an example of the judgment rule setting section. A text editing box 39 for setting a condition to utilize the change frequency previously calculated are further added on the calculating condition setting screen 30. To the text editing box 39, the change number of times from the default setting is set, and the change frequency previously calculated is utilized until the change number set at the text editing box 39.

As shown in FIG. 20, the judgment rule storing section 7 stores, in association with addition of the setting of condition to utilize the change frequency previously calculated to the judgment rule setting section 13, the setting name of the calculating condition corresponding to the settings, the default setting, and the present setting. More specifically, the judgment rule setting section 13 is added with rule names relating to the text editing box 39, which are added to the calculating condition setting screen 30 as shown in FIG. 20, and stores the default setting and the present setting as corresponding to the addition.

As shown in FIG. 21, the frequency storing section 15 stores, in addition to the change frequency of the setting items, and the change frequency of the each panel, the total change number from the default setting, a change frequency of each setting item of the previous calculation as a value calculated previously, a change number of times of each printing setting panel obtained from the previous calculation, and a total change number of times obtained from the previous calculation. More specifically, the total change number (count_d) at the frequency storing setting 15 has the same value as the total change number (count_d) stored in the printing setting storing section 6. The change frequency of each setting item of the previous calculation (P_ave[p_No.] [item_No.]) is a change frequency of each setting item calculated during the immediately prior detecting period, as one calculated previously. The change frequency of each panel of the previous calculation (P_ave[p_No.]) is a change frequency of each printing setting panel calculated during the immediately prior detecting period, as one calculated previously. The total change number of times of the previous calculation (P_count_d) is the total change number of times calculated during the immediately prior detecting period, as one calculated previously.

Next, processing operations of the printer driver 102 and the personal computer 100 having the printer driver 102 in the second embodiment are described with reference to flowcharts shown in FIGS. 16 to 18 in exemplifying a structure displaying the printing dialog box 20 serving as the printing condition setting section 12 and the calculating condition setting screen 30 serving as the judgment rule setting section 13. It is to be noted that the description herein is for a situation where the panel radio button 35 is selected at the calculating setting panel screen 30, or namely where the change frequency is calculated for each printing setting panel. The embodiment in which the change frequency is calculated for each setting item is substantially the same as that in the first embodiment.

Where a user selects printing from the menu of the application, the controller 14 of the printer driver 102 recognizes this selection (step S1), and the panel displaying section 10 displays the printing dialog box 20 (step S2). It is judged at that time as to whether to display the printing setting panel having a high frequency of changes stored in the judgment rule storing section 7 or to display the printing setting panel of the default setting (step S3); the printing setting panel displayed on the front side of the printing dialog box 20 is determined based on that judgment (step S4 or step S5); the panel displaying section 10 displays the printing dialog box 20 so that the determined printing setting panel is displayed on the front side (step S6).

After the printing dialog box 20 is displayed, the controller 14 confirms as to whether the user pushes down the condition setting button 24 of the printing dialog box 20 (step S7), and if the button is pushed down, the judgment rule displaying section 11 displays the calculating condition setting screen 30 (step S8).

After the calculating condition setting screen 30 is displayed, the controller 14 confirms as to whether the reset button 33 of the change number of times is pushed down (step S9), and if the button is pushed down, the change number of times is reset (step S10) so as to render the change number of times (count [p_No.] [item No.] of each setting item stored in the printing setting storing section 6. The panel having a high frequency of setting changes is reset to render zero the panel identification number (p_No.) stored as a panel index having a high frequency of setting changes in the judgment result storing section 9 (step S11).

The controller 14 confirms as to whether the setting save button 31 is pushed down (step S12), and if the button is pushed down, the calculating condition set at the respective setting items of the calculating condition setting screen 30 is saved (step S13). The set calculating condition is at that time stored in boxes of the judgment rule storing 7 corresponding to the respective setting items. After the calculating condition is saved, the judgment rule displaying section 11 closes the calculating condition setting screen 30 (step S15).

The controller 14 further confirms as to whether the cancel button 32 is pushed down (step S14), and if the button is pushed down, the judgment rule displaying section 11 closes the calculating condition setting screen 30 (step S15).

In a situation that the calculating condition setting screen 30 is not displayed, the controller 14 confirms as to whether the printing button 21 is pushed down, and obtains the present day and time (step S42). It is to be noted that the controller 14 confirms as to whether the cancel button 22 is pushed down (step S17) and that if the button is pushed down, the panel displaying section 10 stops printing upon closing the printing dialog box 20.

After the printing button 21 is pushed down and the present day and time is obtained, the controller 14 confirms the detection start day and time of the setting change number of times stored as the present setting of the judgment rule storing section 7 and the detection end day and time of the setting change number of times, and confirms whether the day and time obtained at step S42 is in this range (step S31).

In a case that it is out of the detection period, the controller 14 produces transmission data without calculating the change frequency regardless occurrences of the changes of the printing condition from the default setting. The controller 14 transmits the transmission data to the printer 101 (step S32). The receiving section 41 of the printer 101 receives the transmission data after the transmission data is sent (step S33). The analyzing section 42 analyzes the transmission data (step S34), and the outputting section 43 outputs data based on the analyzed data (step S35).

Where it is within the detection period, the controller 14 makes processing for calculating the frequency of changes. In this processing, the detecting section 4 compares one by one the default setting stored in the printing setting storing section 6 with printing condition set at the printing dialog box, and detects the change number of time for each setting item. The detecting section 4 first renders zero the value p_No. indicating the panel identification number as initializing the panel identification number, and obtains a piece number Max_P of the printing setting panels from the printing setting storing section 6 (step S18). For example, the printing dialog box 20 has the piece number Max_P equal two because of having two printing setting panels. The detecting section 4 subsequently increments the panel identification number (step S19). After this incrementing, the detecting section 4 compares the panel identification number with the piece number Max_P of the printing setting panels and confirms as to whether the number p_No. is not more than the value Max_P (step S20).

In a case where the number p_No. is not more than the value Max_P at step S20, the detecting section 4 renders zero the value [item_No.] indicating setting item identification number as initializing the setting item identification number, and obtains from the printing setting storing section 6 the piece number Max_item of the setting item of the printing setting panel to which the identification number having a value coinciding to the present panel identification number p_No. is assigned (step S21). For example, At the printing dialog box 20, the value Max_item becomes one because the number of the setting items is one in a case of "panel A25", whereas the value Max_item becomes two because the number of the setting items is two in a case of "panel_B26." The detecting section 4 next increments the setting item identification number (step S22). After incrementing, the detecting section 4 compares the setting item identification number with the piece number of the setting items, and confirms as to whether the number p_No. is not more than the value Max_item (step S23).

In a case where the number p_No. is not more than the value Max_item at step S23, the presently set printing condition is obtained from the printing dialog box 20 (step S24). The printing condition (now_set[p_No.] [item_No.]) set at the setting item corresponding to the panel identification number p_No. and the setting item identification number item_No. is obtained. After the printing condition is obtained, the detecting section 4 compares the default setting (def_set [p_No.] [item_No.]) of the setting item corresponding to the incremented panel identification number p_No. and the setting item indentification number item_No. with the obtained printing condition, and confirms as to whether the value (def_set[p_No.] [item_No.]) is equal to the value (now_set[p_No.] [item_No.]) at step S25. In a case where the value (def_set [p_No.] [item_No.]) is equal to the value (now_set[p_No.] [item_No.]), the operation goes to step S22 to confirm as to whether occurrence of changes at other setting items because there is no change from the default setting.

In a case where the value (def_set[p_No.] [item_No.]) is not equal to the value (now_set[p_No.] [item_No.]), the detecting section 4 increments the change number of times of the setting item corresponding to the panel identification number p_No. and the setting item identification number item_No stored in the printing setting storing section 6 (step S26). The detecting section 4 increments the change number of times of the printing setting panel corresponding to the panel identification number p_No. in the printing setting storing section 6 (step S27). After incrementing, the detecting section 4 increments the total change number of time stored in the printing setting storing section 6 (step S36). After incrementing of the total change number, the operation goes to step S22 to confirm as to whether occurrence of changes at other setting items.

Where the value item_No. is greater than the value Max_item at step S23, the operation goes to step S19 since it is completed to confirm occurrences of changes of the setting item formed in the printing setting panel corresponding to the incremented panel identification number p_No., and substantially the same comparison is made to other printing setting panels. Where the value p_No. is greater than the value Max_P at step S20, it is completed to confirm occurrence of changes of the entire setting items, and therefore, it is confirmed as to whether the total change number (count_d) from the default setting-is equal to or more than a value (use_old_ave_count) set at the text editing box 39 of the calculating condition setting screen 30. That is, it is confirmed as to whether it is the number of times requiring to utilize the change frequency calculated previously as set in the calculating condition setting screen 30 (step S39). If the total change number (count_d) is less than the value (use_old_ave_count), the frequency calculating section 5, in reference to the frequency storing section 15 for use the change frequency calculated previously, temporarily renders the change frequency (ave [p_No.] [item_d]) equal to the value P_ave[p_No.] [item_No.], and utilizes the change frequency of each setting item previously calculated (step S40). The frequency calculating section 5, in reference to the frequency storing section 15, temporarily renders the change frequency (ave [p_No.]) equal to the value P_ave[p_No.], and utilizes the change frequency of each panel previously calculated (step S41). Based on those previously calculated change frequencies, the printing setting panel to be displayed on the front side of the printing dialog box 20 is judged. For example, where the change frequency as shown in FIG. 21 is stored in the frequency storing section 15, the total change number of times (count_d) is equal to nine, which is less than fifty (50), the value set with the text editing box 39 in the calculating condition setting screen 30 shown in FIG. 19. That is, this program utilizes the change frequency calculated previously. The change frequency of each setting item calculated during the detecting period of current time is ave[1] [1]=2/9, ave[2] [1]=3/9, and ave[2] [2]=4/9, and those values are not utilized for judgment of the printing setting panel to be displayed on the front side, but the change frequency of each setting item of the previous calculation shored in the frequency storing section 15 is used. At that time, temporarily, it is set that ave[1] [1]=P_ave[1] [1]=30/50, ave[2] [1]=P_ave[2] [1]=15/50, and ave[2] [2]=P_ave[2] [2]=5/50, and those values are utilized for judgment of the printing setting panel to be displayed on the front side (step S40). The change frequency of each printing setting panel is also processed in substantially the same way. The change frequency of each printing setting panel calculated during the detecting period of current time is ave_p [1]=2/9, and ave_p[2]=7/9, and those values are not utilized for judgment of the printing setting panel to be displayed on the front side, but the change frequency of each printing setting panel of the previous calculation shored in the frequency storing section 15 is used. At that time, temporarily, it is set that ave_p[1]=P_ave_p[1]=30/50, and ave_p[2]= P_ave_p[2]=20/50, and those values are utilized for judgment of the printing setting panel to be displayed on the front side (step S41).

If at step S39 the value (count_d) is equal to or more than the value (use_old_ave_count), the change frequency previously calculated is not utilized, and in the same way as in the second embodiment, the frequency calculating section 5 calculates the change frequency ave[p_No.] [item_d] of the each setting item using the change number (count[p_No.] [item_No.]) of each setting item and the total change number (count_d) stored in the printing setting storing section 6, or namely from a formula ave[p_No.] [item_d]=count[p_No.] [item_No.])/(count_d) (step S37). Moreover, the frequency calculating section 5 calculates the change frequency (ave [p_No.] [item_d]) of the each printing setting panel using the change number (count[p_No.] [item_No.]) of each panel and the total change number (count_d) stored in the printing setting storing section 6, or namely from a formula ave[p_No.] [item_d]=count[p_No.] [item_No.])/(count_d) (step S38). For example, the change frequency ave [2] of "panel_B26" corresponding to the value_p No. becomes 70/90 (=ave [2] [2]) based on the printing setting storing section 6 shown in FIG. 13. The calculated change frequency is stored in the frequency storing section 15 as the previous change frequency so that ave[p_No.] [item_d]=P_ave[p_No.] [item_d], ave_p[p_No.]=P_ave_p[p_No.], and count_d=P_count_d.

Figure 25:
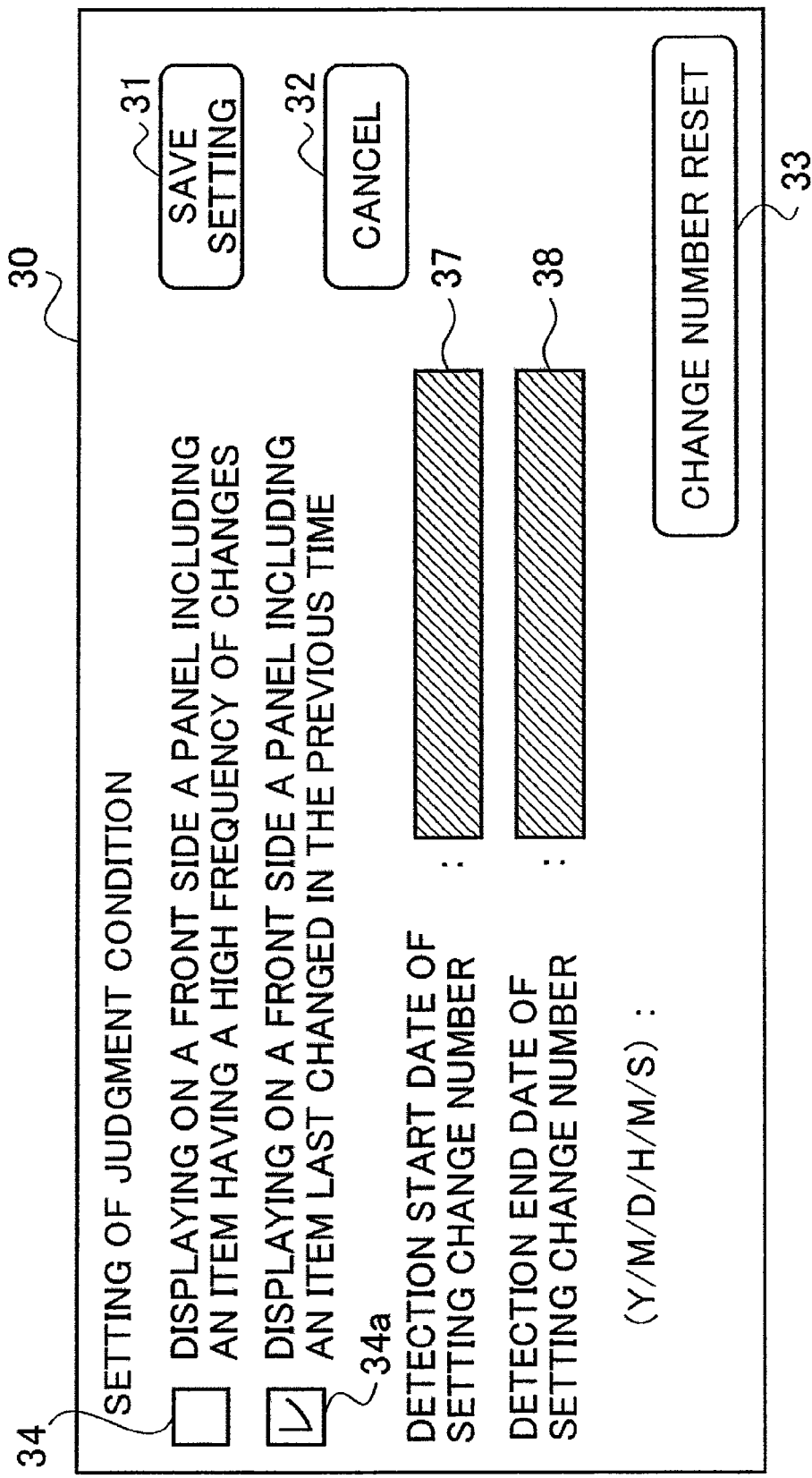
FIG. 25 is a schematic diagram showing a calculation condition setting box as an example of a judgment rule setting section of the printer driver described as a modified program of the invention.

After calculation of the change frequency, confirmed are the settings of the panel radio button 35 and the setting item radio button 36 stored in the judgment rule storing section 7, and it is confirmed as to whether the target for judging the printing setting panel to be displayed on the front side of the printing dialog box 20 is the change frequency of each setting item (step S28). Where the judging target is for each printing setting panel, the judging section 8 makes reference to the frequency storing section 15, and obtains the panel identification number (p_No.) having the highest change frequency (ave [p_No.]) of each panel. The judging section 8 stores this panel identification number (p_No) in the judgment result storing section 9 (step S30). On the other hand, where the judging target is for each setting item, the judging section 8 makes reference to the frequency storing section 15, and obtains the panel identification number (p_No.) including a setting item having the highest change frequency (ave [p_No.] [item_No.]). The judging section 8 stores this panel identification number (p_No) in the judgment result storing section 9 (step S29). The controller 14 produces transmission data after the storing process, and transmits the transmission data to the printer 101 (step S32). After the transmission data are sent, the receiving section 41 of the printer 101 receives the transmission data (step S33). The analyzing section 42 analyzes the transmission data (step S34), and the outputting section 43 outputs the data based on the analyzed data (step S35). As described above, with the printer driver and the personal computer having the printer driver, which are described in the third embodiment, the change frequency previously calculated is utilized where the change number is less than the preset value. Therefore, the printer driver can utilize the change frequency with higher reliability, thereby improving its usability. In the first to third embodiment, the printer driver includes the frequency calculating section for calculating the change frequency, and the frequency storing section for memorizing the frequency of each setting item calculated from the frequency calculating section, and decides the setting item to be displayed on the front side of the monitor of the personal computer during the booting stage of the printing setting program based on the change frequency. Alternatively, the printer driver according to the invention, in lieu of this structure, may have a structure to overwrite the identification number of the setting item whose change is detected by the detecting section and the identification number of the panel including that item. With this structure, the calculating condition setting screen 30 is added with a check box 34a for making selectable displaying the panel including the item changed last in the previous time as shown in FIG. 25. Only one of the check boxes 34, 34a can be selected, and if the check box 34a is checked, the detection start date text editing box 37 and the detection end date text editing box 38 are made unable to be entered as shown in FIG. 25.

Next, in operation of a situation that the check box 34a is selected, if the printer driver 102 recognizes that the printing process is selected from the application, the detecting section 4 detects at each setting change the identification number of the changed item and the identification number of the panel including that item, and the controller 14 saves those identification numbers to the boxes of p_No. and item_No. of the judgment result storing section 9. For example, if "automatic tray selection" is changed, the detecting section 4 detects the identification number [2] of "automatic tray selection" and the identification number [2] of the panel including the item of "automatic tray selection," and the controller 14 overwrites those values to the judgment result storing section 9 and saves the values (see FIG. 26). After completion of the printing setting in a way described above, when a user selects "print" from the menu of the application again, the controller 14 reads out data from the judgment result storing section 9, and retrieves the panel identification number [2]. The controller 14 instructs the panel displaying section 10 based on the panel identification number [2] to display "panel_B" including the item of "automatic tray selection."

In the first to third embodiments, examples in which the personal computer is applied to the information processing apparatus and connected to the printer, but this invention is not limited to this structure, this invention is applicable to a mobile phone as the information processing apparatus. In addition, this invention is applicable to a multi-function printer in lieu of the printer.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention should not be limited by the specification, but be defined by the claims set forth below.

What is claimed is:

1. A non-transitory printing setting program disposed on a computer readable medium which can be executed by an information processing apparatus for setting a printing condition, the printing setting program comprising:
a setting section, the setting section having (i) a plurality of printing condition setting sections, each of the printing condition setting sections having a setting item for setting a printing condition, and (ii) a judgment rule setting section configured to set a calculating condition for calculating a frequency of changes of the setting item;
a displaying section configured to display the printing condition setting sections and the judgment rule setting section;
a detecting section configured to detect a change of the setting item;
a frequency calculating section configured to calculate a frequency of changes of the setting item detected by the detecting section;
a judging section configured to determine the printing condition setting section having the setting item of a high frequency of changes;
a printing setting storing section configured to store an initial setting value of the setting item and a detection result at the detecting section;
a frequency storing section configured to store the frequency of changes calculated at the frequency calculating section;
a judgment result storing section configured to store a judgment result at the judging section; and
a judgment rule storing section configured to store the calculating condition at the judgment rule setting section,
wherein the judging section determines one of the plurality of printing condition setting sections displayed in a front of the rest of the plurality of printing condition setting sections according to the frequency of changes stored in the frequency storing section.

2. The printing setting program according to claim 1, wherein the frequency of changes is overwritten in the frequency storing section every time the detecting section detects the change of the setting item.

3. The printing setting program according to claim 1, wherein the displaying section includes a panel displaying section configured to display the printing condition setting section, and also includes a judgment rule displaying section configured to display the judgment rule setting section.

4. The printing setting program according to claim 1,
wherein the frequency calculating section calculates the frequency of changes for each printing condition setting section based on a total number of the changes of the setting items belonging to the same printing condition setting section.

5. The printing setting program according to claim 1, wherein the frequency storing section stores the frequency of changes of previously calculated at the frequency calculating section, and
wherein the judging section determines one of the plural printing condition setting section displayed in a front of the plural printing condition setting section at a start of the printing setting program according to the previously calculated frequency of changes stored in the frequency storing section.

6. An information processing apparatus comprising:
a setting section, the setting section having (i) a plurality of printing condition setting sections, each of the printing condition setting sections having a setting item for setting a printing condition, and (ii) a judgment rule setting section configured to set a calculating condition for calculating a frequency of changes of the setting item;

a displaying section configured to display the printing condition setting sections and the judgment rule setting section;

a detecting section configured to detect a change of the setting item;

a frequency calculating section configured to calculate a frequency of changes of the setting item detected by the detecting section;

a judging section configured to determine the printing condition setting section having the setting item of a high frequency of changes;

printing setting storing section configured to store an initial setting value of the setting item and a detection result at the detecting section;

a judgment rule storing section configured to store the calculating condition set at the judgment rule setting section;

a frequency storing section configured to store the frequency of changes calculated at the frequency calculating section; and a judgment result storing section configured to store a judgment result at the judging section, wherein the judging section determines one of the plurality of printing condition setting sections displayed in a front of the rest of the plurality of printing condition setting sections according to the frequency of changes stored in the frequency storing section.

* * * * *